(12) United States Patent     (10) Patent No.:   US 12,676,302 B2

Jun et al.        (45) Date of Patent:     Jul. 7, 2026

(54) NEGATIVE ELECTRODE FOR LITHIUM SECONDARY BATTERY, METHOD FOR PREPARING NEGATIVE ELECTRODE FOR LITHIUM SECONDARY BATTERY, AND LITHIUM SECONDARY BATTERY COMPRISING NEGATIVE ELECTRODE

(71) Applicant: LG ENERGY SOLUTION, LTD., Seoul (KR)

(72) Inventors: Chan Soo Jun, Daejeon (KR); Yohan Kwon, Daejeon (KR); Su Jin Park, Daejeon (KR); Jaewook Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 613 days.

(21) Appl. No.: 18/077,535

(22) Filed: Dec. 8, 2022

(65) Prior Publication Data

US 2023/0253551 A1     Aug. 10, 2023

(30) Foreign Application Priority Data

Feb. 9, 2022    (KR) ........................ 10-2022-0016616

(51) Int. Cl.
| | |
|---|---|
| *H01M 4/36* | (2006.01) |
| *H01M 4/134* | (2010.01) |
| *H01M 10/0525* | (2010.01) |
| *H01M 4/02* | (2006.01) |
| *H01M 4/04* | (2006.01) |

(Continued)

(52) U.S. Cl.
CPC ........... *H01M 4/366* (2013.01); *H01M 4/134* (2013.01); *H01M 10/0525* (2013.01); *H01M 2004/027* (2013.01); *H01M 4/04* (2013.01);

*H01M 4/0404* (2013.01); *H01M 4/583* (2013.01); *H01M 4/62* (2013.01); *H01M 4/8828* (2013.01); *H01M 4/8882* (2013.01); *H01M 4/8889* (2013.01)

(58) Field of Classification Search
CPC ...... H01M 4/04; H01M 4/0404; H01M 4/134; H01M 4/366; H01M 4/583; H01M 4/62; H01M 4/8828; H01M 4/8882; H01M 4/8889; H01M 10/0525; H01M 2004/027
USPC .......................................... 429/209; 427/115
See application file for complete search history.

(56) References Cited

U.S. PATENT DOCUMENTS

| | | | | |
|---|---|---|---|---|
| 10,608,289 B2 * | 3/2020 | Kim | ................. | H01M 10/4235 |
| 11,322,736 B2 * | 5/2022 | Song | .................. | H01M 4/1391 |

(Continued)

FOREIGN PATENT DOCUMENTS

| | | |
|---|---|---|
| EP | 3 796 426 A1 | 3/2021 |
| EP | 3 905 390 A1 | 11/2021 |

(Continued)

OTHER PUBLICATIONS

International Search Report for International Application No. PCT/KR2022/019534, dated Mar. 21, 2023.

(Continued)

*Primary Examiner* — Brian K Talbot
(74) *Attorney, Agent, or Firm* — Birch, Stewart, Kolasch & Birch, LLP

(57) ABSTRACT

A negative electrode for a lithium secondary battery, a method for preparing a negative electrode for a lithium secondary battery, and a lithium secondary battery comprising the negative electrode.

16 Claims, 5 Drawing Sheets

(51) Int. Cl.
     *H01M 4/583*     (2010.01)
     *H01M 4/62*     (2006.01)
     *H01M 4/88*     (2006.01)

(56)     References Cited

U.S. PATENT DOCUMENTS

| | | | |
|---|---|---|---|
| 12,095,073 B2 * | 9/2024 | Ishikawa | H01M 4/364 |
| 2015/0340732 A1 * | 11/2015 | Kim | H01M 4/366 |
| | | | 429/246 |
| 2016/0006024 A1 * | 1/2016 | Xiao | H01M 4/0402 |
| | | | 429/231.1 |
| 2016/0285081 A1 * | 9/2016 | Matsuno | H01M 4/386 |
| 2018/0013136 A1 * | 1/2018 | Mizuno | H01M 4/131 |
| 2020/0313160 A1 * | 10/2020 | Masarapu | H01M 4/134 |
| 2020/0335769 A1 * | 10/2020 | Chae | H01M 4/483 |
| 2020/0365883 A1 | 11/2020 | Lee et al. | |
| 2021/0083273 A1 | 3/2021 | Song et al. | |
| 2021/0119200 A1 | 4/2021 | Nam | |
| 2021/0234191 A1 | 7/2021 | Lee et al. | |
| 2021/0347787 A1 | 11/2021 | Lee et al. | |
| 2022/0006074 A1 | 1/2022 | Kim et al. | |
| 2023/0016746 A1 | 1/2023 | Jun et al. | |
| 2023/0021692 A1 | 1/2023 | Jun et al. | |
| 2023/0117733 A1 | 4/2023 | Kim et al. | |
| 2024/0213448 A1 | 6/2024 | Lee et al. | |
| 2025/0087666 A1 | 3/2025 | Jeon et al. | |

FOREIGN PATENT DOCUMENTS

| | | | |
|---|---|---|---|
| JP | 2009-80971 A | 4/2009 | |
| JP | 2016-181331 A | 10/2016 | |
| JP | 6047990 B2 | 12/2016 | |
| JP | 2020-13754 A | 1/2020 | |
| JP | 2020-509541 A | 3/2020 | |
| JP | 2021-48106 A | 3/2021 | |
| JP | 2021-180171 A | 11/2021 | |
| JP | 2024-500141 A | 1/2024 | |
| JP | 2024-514922 A | 4/2024 | |
| JP | 2024-517978 A | 4/2024 | |
| KR | 10-2017-0030791 A | 3/2017 | |
| KR | 10-1820445 B1 | 1/2018 | |
| KR | 10-2018-0042299 A | 4/2019 | |
| KR | 10-2019-0090497 A | 8/2019 | |
| KR | 10-2020-0089813 A | 7/2020 | |
| KR | 10-2020-0132749 A | 11/2020 | |
| KR | 10-2021-0030142 A | 3/2021 | |
| KR | 10-2021-0039599 A | 4/2021 | |
| KR | 10-2021-0096814 A | 8/2021 | |
| KR | 10-2021-0143980 A | 11/2021 | |
| WO | WO 2023/282684 A1 | 1/2023 | |

OTHER PUBLICATIONS

Written Opinion of the International Searching Authority for International Application No. PCT/KR2022/019534, dated Mar. 21, 2023.

Japanese Office Action for Japanese Application No. 2024-517140, dated Apr. 8, 2025, with English translation.

Extended European Search Report for European Application No. 22926200.1, dated May 22, 2025.

* cited by examiner

[Figure 1]
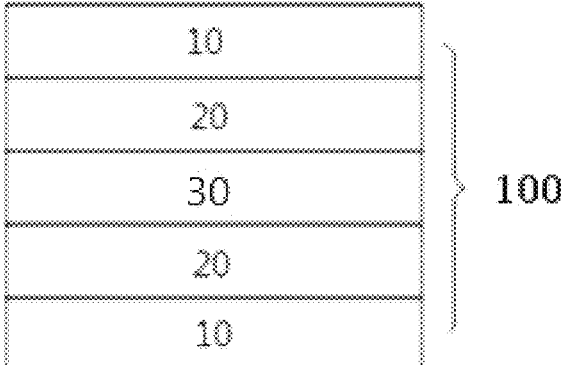
[Figure 2]
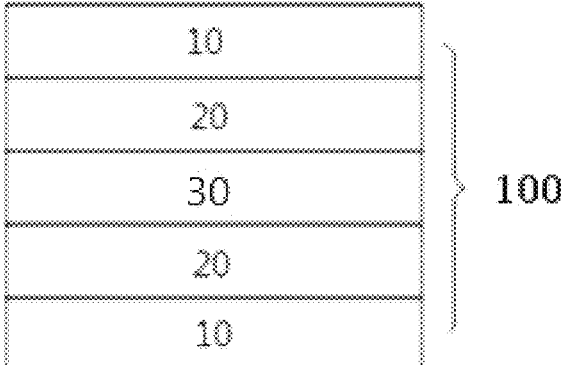

[Figure 3]
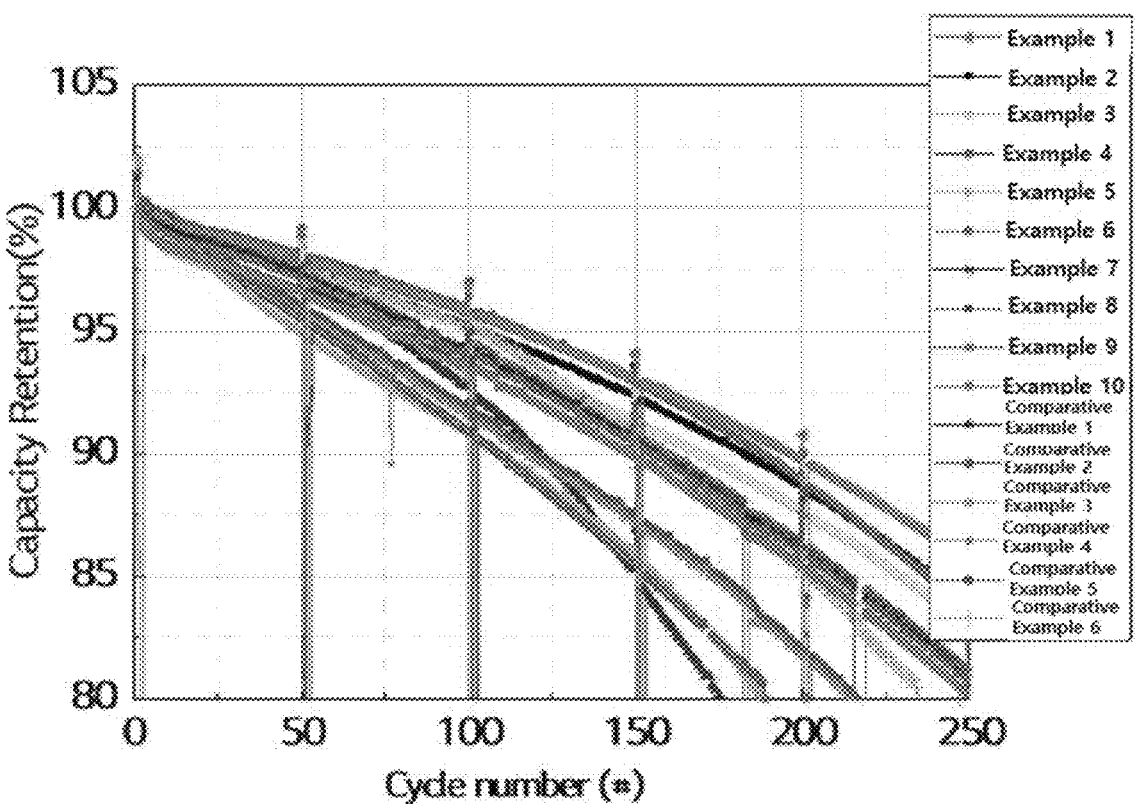

[Figure 4]
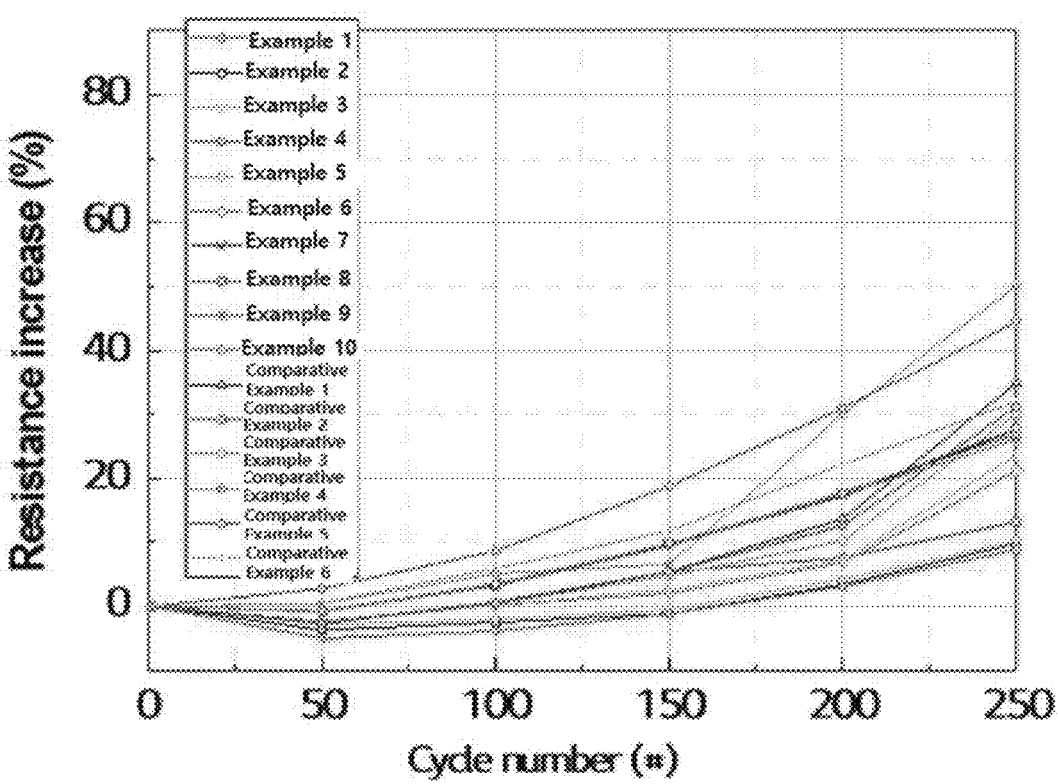

[Figure 5]
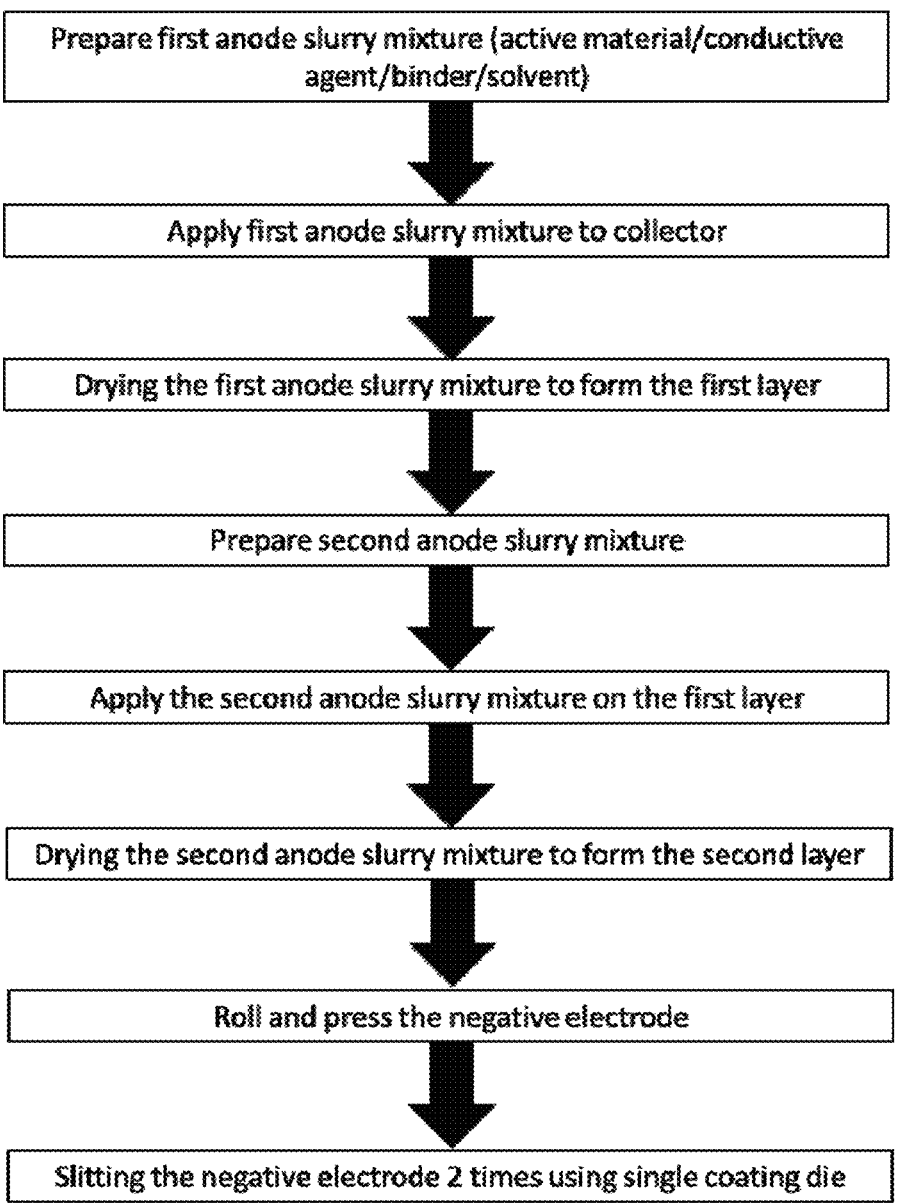

[Figure 6]
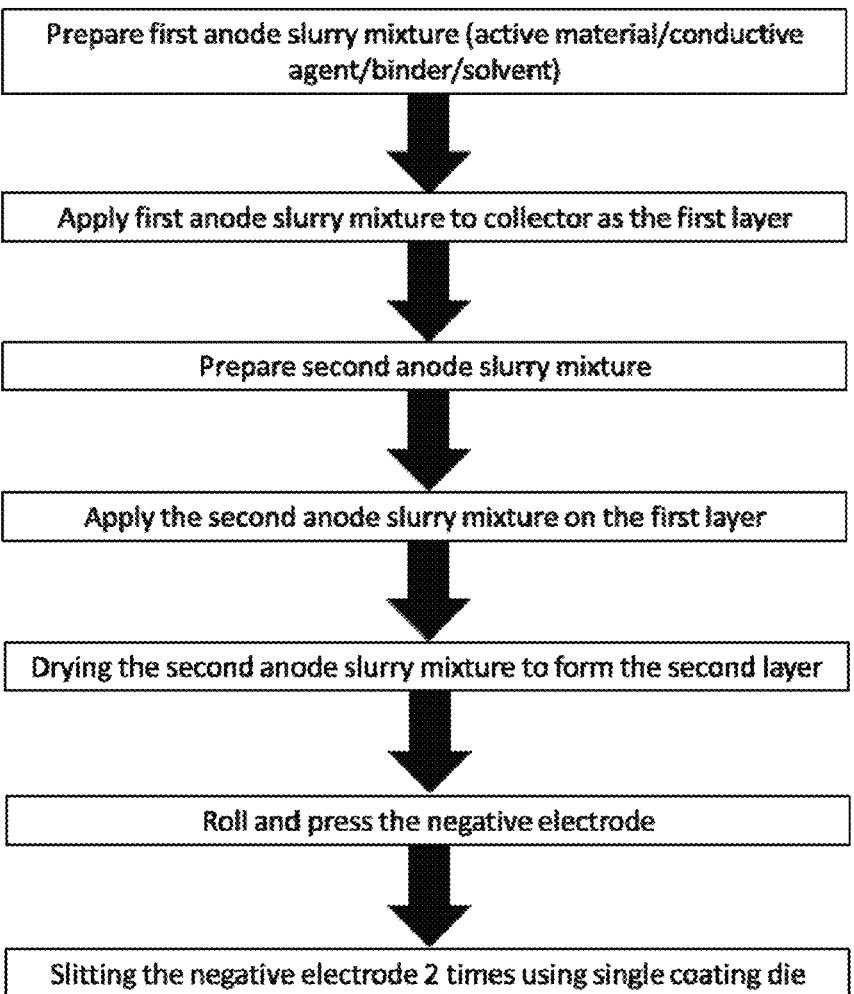

NEGATIVE ELECTRODE FOR LITHIUM SECONDARY BATTERY, METHOD FOR PREPARING NEGATIVE ELECTRODE FOR LITHIUM SECONDARY BATTERY, AND LITHIUM SECONDARY BATTERY COMPRISING NEGATIVE ELECTRODE

CROSS-REFERENCE TO RELATED APPLICATIONS

This application claims priority to and the benefit of Korean Patent Application No. 10-2022-0016616 filed in the Korean Intellectual Property Office on Feb. 9, 2022, the entire contents of which are expressly incorporated herein by reference.

TECHNICAL FIELD

The present application relates to a negative electrode for a lithium secondary battery, a method for preparing a negative electrode for a lithium secondary battery, and a lithium secondary battery comprising the negative electrode.

BACKGROUND ART

Demands for the use of alternative energy or clean energy are increasing due to the rapid increase in the use of fossil fuels, and as a part of this trend, the most actively studied field is a field of electricity generation and electricity storage using an electrochemical reaction. Currently, representative examples of an electrochemical device using such electrochemical energy comprise a secondary battery, and the usage areas thereof are increasing more and more.

As technology development of and demand for mobile devices have increased, demands for secondary batteries as an energy source have been rapidly increased. Among such secondary batteries, lithium secondary batteries having high energy density and voltage, long cycle life, and low self-discharge rate have been commercialized and widely used. Further, as an electrode for such a high capacity lithium secondary battery, studies have been actively conducted on a method for preparing a high-density electrode having a higher energy density per unit volume.

In general, a secondary battery includes a positive electrode, a negative electrode, an electrolyte, and a separator. The negative electrode comprises a negative electrode active material for intercalating and de-intercalating lithium ions from the positive electrode, and as the negative electrode active material, a silicon-containing particle having high discharge capacity may be used.

In particular, recently, in response to the demand for a high-density energy battery, studies have been actively conducted on a method for increasing the capacity using a silicon-containing compound such as Si/C or SiOx, which has a 10-fold higher capacity than a graphite-containing material, as a negative electrode active material. However, the silicon-containing compound, which is a high-capacity material, is a material having a high capacity compared to graphite used in the related art, and has excellent capacity characteristics, but the volume rapidly expands during the charging process to disconnect the conductive path, resulting in deterioration in battery characteristics, and accordingly, the capacity decreases from the initial stage. In addition, for a silicon-containing negative electrode, when the charging and discharging cycle is repeated, lithium ions are not uniformly charged in the depth direction of the negative electrode and reactions proceed on the surface, so that as surface degradation is accelerated, the performance needs to be improved in terms of battery cycle.

Thus, to solve the above problem when the silicon-containing compound is used as a negative electrode active material, various measures such as a measure of adjusting the driving potential, additionally a measure of suppressing the volume expansion itself such as a method of further coating an active material layer with a thin film and a method of controlling the particle diameter of the silicon-containing compound, or the development of a binder capable of suppressing the volume expansion of the silicon-containing compound to prevent the conductive path from being disconnected have been discussed. Furthermore, studies to complement the service life characteristics of the silicon-containing negative electrode by limiting the proportion of silicon-containing active material used during initial charging and discharging by a pre-lithiation method of a silicon-containing active material layer, and imparting a reservoir role have also been conducted.

However, since the above measures may make the performance of the battery rather deteriorate, there is a limitation in application, so that there is still a limitation in commercialization for the preparation of a negative electrode battery with a high content of a silicon-containing compound, and as the proportion of silicon-containing active material included in the silicon-containing active material layer is increased, pre-lithiation is concentrated on the surface of the negative electrode, and consequently, the silicon-containing active material on the surface side becomes damaged, and as a heterogeneous pre-lithiation occurs, a problem with the improvement of service life characteristics occurs.

Therefore, there is still a need for studies capable of improving the cycle performance by preventing the electrode surface degradation during the charging and discharging cycle without causing a deterioration in capacity characteristics even when a silicon-containing compound is used as an active material in order to improve the capacity characteristics.

RELATED ART DOCUMENT

Patent Document (Patent Document 1) Japanese Patent Application Laid-Open No. 2009-080971

SUMMARY OF THE INVENTION

The present application has been made in an effort to provide a negative electrode for a lithium secondary battery, which is capable of achieving the maximization of capacity characteristics, which is the main object of using a silicon-containing active material, and simultaneously is capable of preventing the degradation of the electrode surface during charging and discharging cycles, which is an existing problem while using the silicon-containing active material on a negative electrode, and furthermore, is capable of improving the cycle performance along with capacity characteristics of a lithium secondary battery by enhancing the uniformity during pre-lithiation, a method for preparing a negative electrode for a lithium secondary battery, and a lithium secondary battery comprising the negative electrode.

An exemplary embodiment of the present specification provides a negative electrode for a lithium secondary battery, comprising: a negative electrode current collector layer; a first negative electrode active material layer on one surface or both surfaces of the negative electrode current collector layer; and a second negative electrode active material layer on a surface opposite to a surface of the first negative electrode active material layer facing the negative electrode current collector layer, in which the first negative electrode active material layer comprises a first negative electrode active material layer composition comprising a first negative electrode active material, the second negative electrode active material layer comprises a second negative electrode active material layer composition comprising a second negative electrode active material, the first negative electrode active material comprises one or more selected from the group consisting of SiOx, wherein x=0 and SiOx, wherein 0<x<2, and comprises 95 parts by weight or more of the SiOx, wherein x=0 based on 100 parts by weight of the first negative electrode active material, the second negative electrode active material comprises a mixture of one or more selected from the group consisting of a carbon-containing active material, a silicon-containing active material, a metal-containing active material capable of forming an alloy with lithium and a lithium-containing nitride, and a weight loading amount (A) of the first negative electrode active material layer composition and a weight loading amount (B) of the second negative electrode active material layer composition satisfy the following Equation 1:

$$10 \leq (B/(A+B)) \times 100(\%) \leq 50. \qquad \text{[Equation 1]}$$

In addition, the first negative electrode active material layer may be in contact with part or an entire surface of the negative electrode current collector layer, and the second negative electrode active material layer may be in contact with part or an entire surface of the first negative electrode active material layer.

Another exemplary embodiment provides a method for preparing a negative electrode for a lithium secondary battery, the method comprising: providing a negative electrode current collector layer; forming a first negative electrode active material layer by applying a first negative electrode active material layer composition to one surface or both surfaces of the negative electrode current collector layer; and forming a second negative electrode active material layer by applying a second negative electrode active material layer composition to a surface opposite to a surface of the first negative electrode active material layer facing the negative electrode current collector layer, in which the first negative electrode active material comprises one or more selected from the group consisting of SiOx (x=0) and SiOx (0<x<2), and comprises 95 parts by weight or more of the SiOx (x=0) based on 100 parts by weight of the first negative electrode active material, the second negative electrode active material comprises a mixture of one or more selected from the group consisting of a carbon-containing active material, a silicon-containing active material, a metal-containing active material capable of forming an alloy with lithium and a lithium-containing nitride, and a weight loading amount (A) of the first negative electrode active material layer composition and a weight loading amount (B) of the second negative electrode active material layer composition satisfy Equation 1. In addition, the first negative electrode active material layer may be applied to be in contact with part or an entire surface of the negative electrode current collector layer, and the second negative electrode active material layer may be applied to be in contact with part or an entire surface of the first negative electrode active material layer.

Still another exemplary embodiment provides a lithium secondary battery comprising: a positive electrode; the negative electrode for a lithium secondary battery according to the present application; a separator provided between the positive electrode and the negative electrode; and an electrolyte.

The negative electrode for a lithium secondary battery according to an exemplary embodiment of the present invention has a double layer active material layer including a first negative electrode active material layer and a second negative electrode active material layer. In particular, a first negative electrode active material included in the first negative electrode active material layer comprises one or more selected from the group consisting of SiOx (x=0) and SiOx (0<x<2), and comprises 95 parts by weight or more of the SiOx (x=0) based on 100 parts by weight of the first negative electrode active material, and the second negative electrode active material comprised in the second negative electrode active material layer comprises one or more selected from the group consisting of a carbon-containing active material, a silicon-containing active material, a metal-containing active material capable of forming an alloy with lithium and a lithium-containing nitride.

The negative electrode for a lithium secondary battery according to the present application may have a double layer active material layer having the specific composition and content as described above, and may have advantages favorable for high capacity, high density and quick charging as it is particularly because the first negative electrode active material layer comprises a high content of SiOx (x=0). Furthermore, by comprising a silicon-containing active material and/or a carbon-containing active material, and the like in the second negative electrode active material layer, it is possible to prevent electrode surface degradation during the charging and discharging cycle, and it is also possible to enhance the uniformity during pre-lithiation.

Among them, particularly, in the negative electrode for a lithium secondary battery according to the present application, the weight loading amounts of the first negative electrode active material layer composition and the second negative electrode active material layer composition satisfy the range of Equation 1. That is, for the negative electrode for a lithium secondary battery according to the present application, a weight loading ratio of a first negative electrode active material layer composition having high capacity characteristics and a second negative electrode active material layer composition which can control a reaction heterogeneity in which the reaction is concentrated only on the electrode surface during the charging and discharging of the first negative electrode active material layer, and which is excellent in durability, was optimized in the preparation of a negative electrode having the same capacity. Accordingly, a lithium secondary battery comprising the same is mainly characterized by satisfying both optimum capacity characteristics, which are advantages of the Si negative electrode, and cycle characteristics.

After all, the negative electrode for a lithium secondary battery according to the present application may be that wherein the first negative electrode active material layer and the second negative electrode active material layer included as a double layer to which a specific composition and a specific weight loading amount are applied in order to take an advantage of an electrode to which a high content of Si particles as an active material having a single layer are applied and simultaneously solve a surface degradation problem, a problem of uniformity during pre-lithiation and a problem of service life characteristics, which are disadvantages when the electrode has the advantage.

BRIEF DESCRIPTION OF THE DRAWINGS

FIG. 1 is a view illustrating the stacking structure of a negative electrode for a lithium secondary battery according to an exemplary embodiment of the present application.

FIG. 2 is a view illustrating the stacking structure of a negative electrode for a lithium secondary battery according to an exemplary embodiment of the present application.

FIG. 3 illustrates a graph of in-situ capacity retention rates according to Examples and Comparative Examples.

FIG. 4 illustrates a graph of RPT resistance increase rates according to the Examples and the Comparative Examples.

FIG. 5 is a flow chart of the wet on dry process, which is a process of applying and coating a first negative electrode composition on a negative electrode current collector layer, and applying a second negative electrode composition after drying to form a two-layer negative electrode active material layer. In the case of forming as described above, the interface of the first negative electrode active material layer and the second negative electrode active material layer is separated.

FIG. 6 is a flow chart of the wet on wet process, which is a process of applying and coating a first negative electrode composition on a negative electrode current collector layer, and applying a second negative electrode composition without drying to form a two-layer negative electrode active material layer. In the case of forming as described above, the interface of the first negative electrode active material layer and the second negative electrode active material layer is not separated.

DETAILED DESCRIPTION

Prior to the description of the present invention, some terms will be first defined.

When one part "includes" one constituent element in the present specification, unless otherwise specifically described, this does not mean that another constituent element is excluded, but means that another constituent element may be further included.

In the present specification, 'p to q' means a range of 'p or more and q or less'.

In the present specification, "specific surface area" is measured by the BET method, and is specifically calculated from an amount of nitrogen gas adsorbed under liquid nitrogen temperature (77K) using BELSORP-mini II manufactured by BEL Japan, Inc. That is, in the present application, the BET specific surface area may mean a specific surface area measured by the measurement method.

In the present specification, "Dn" means the particle diameter distribution, and means the particle diameter at the n % point of the cumulative distribution of the number of particles according to the particle diameter. That is, D50 is the particle diameter (average particle diameter, median particle diameter) at the 50% point of the cumulative distribution of the number of particles according to the particle diameter, D90 is the particle diameter at the 90% point of the cumulative distribution of the number of particles according to the particle diameter, and D10 is the particle diameter at the 10% point of the cumulative distribution of the number of particles according to the particle diameter. Meanwhile, the particle diameter distribution may be measured using a laser diffraction method. Specifically, after a powder to be measured is dispersed in a dispersion medium, a particle diameter distribution is calculated by introducing the resulting dispersion into a commercially available laser diffraction particle diameter measurement device (for example, Microtrac S3500) to measure the difference in diffraction pattern according to the particle size when particles pass through the laser beam.

In the present specification, the fact that a polymer comprises a monomer as a monomer unit means that the monomer participates in a polymerization reaction, and thus is included as a repeating unit in the polymer. In the present specification, when the polymer comprises a monomer, it is interpreted to be the same as when the polymer comprises a monomer as a monomer unit.

In the present specification, the 'polymer' is understood to be used in a broad sense, comprising a copolymer, unless otherwise specified as a 'homopolymer'.

In the present specification, a weight average molecular weight (Mw) and a number average molecular weight (Mn) are polystyrene-conversion molecular weights measured by gel permeation chromatography (GPC) using a monodisperse polystyrene polymer (standard sample) with various degrees of polymerization commercially available for the measurement of the molecular weight as a standard material. In the present specification, the molecular weight means a weight average molecular weight unless otherwise described.

Hereinafter, the present invention will be described in detail with reference to drawings, such that a person with ordinary skill in the art to which the present invention pertains can easily carry out the present invention. However, the present invention can be implemented in various different forms, and is not limited to the following description.

An exemplary embodiment of the present specification provides a negative electrode for a lithium secondary battery, comprising: a negative electrode current collector layer; a first negative electrode active material layer on one surface or both surfaces of the negative electrode current collector layer; and a second negative electrode active material layer on a surface opposite to a surface of the first negative electrode active material layer facing the negative electrode current collector layer, in which the first negative electrode active material layer comprises a first negative electrode active material layer composition comprising a first negative electrode active material, the second negative electrode active material layer comprises a second negative electrode active material layer composition comprising a second negative electrode active material, the first negative electrode active material comprises one or more selected from the group consisting of SiOx (x=0) and SiOx (0<x<2), and comprises 95 parts by weight or more of the SiOx (x=0) based on 100 parts by weight of the first negative electrode active material, the second negative electrode active material comprises one or more selected from the group consisting of a carbon-containing active material, a silicon-containing active material, a metal-containing active material capable of forming an alloy with lithium and a lithium-containing nitride, and a weight loading amount (A) of the first negative electrode active material layer composition and a weight loading amount (B) of the second negative electrode active material layer composition satisfy the following Equation 1:

$$10 \leq (B/(A+B)) \times 100 \leq 50. \qquad \text{[Equation 1]}$$

In the negative electrode for a lithium secondary battery according to the present application, the weight loading amounts of the first negative electrode active material layer composition and the second negative electrode active material layer composition satisfy the range of Equation 1. That is, for the negative electrode for a lithium secondary battery according to the present application, a loading ratio of a first negative electrode active material layer composition having high capacity characteristics and a second negative electrode active material layer composition which can control the problems of a reaction heterogeneity in which the reaction is concentrated only on the electrode surface during the charging and discharging of the first negative electrode active material layer and uniformity during pre-lithiation, and which is excellent in durability, was optimized in the preparation of a negative electrode having the same capacity. Accordingly, a lithium secondary battery comprising the same is mainly characterized by satisfying both optimum capacity characteristics, which are advantageous for the Si negative electrode, and service life characteristics.

FIG. 1 is a view illustrating the stacking structure of a negative electrode for a lithium secondary battery according to an exemplary embodiment of the present application. Specifically, it is possible to confirm a negative electrode 100 for a lithium secondary battery, comprising a first negative electrode active material layer 20 and a second negative electrode active material layer 10 on one surface of a negative electrode current collector layer 30, and FIG. 1 illustrates the first negative electrode active material layer on one surface, but the first negative electrode active material layer may be included on both surfaces of the negative electrode current collector layer. As shown, the first negative electrode active material layer may be contact with an entire surface of the negative electrode current collector layer, and the second negative electrode active material layer may be in contact with an entire surface of the first negative electrode active material layer.

As shown in FIG. 2, a first negative electrode active material layer 20 and a second negative electrode active material layer 30 may be formed on both surfaces of a negative electrode current collector layer 30. As shown in FIG. 2, the arrangement may be 10>20>30>20>10. Additional arrangements may be 10>20>30>20, 10>20>30>10, 10>20>30>10>20. Also, the composition of the active material layer to be coated on both sides may be the same or different from each other. It is preferable that both sides of the active material layer have the same composition, e.g., 10>20>30>10.

Hereinafter, the negative electrode for a lithium secondary battery of the present invention will be described in more detail.

In an exemplary embodiment of the present application, provided is a negative electrode for a lithium secondary battery, comprising: a negative electrode current collector layer; a first negative electrode active material layer on one surface or both surfaces of the negative electrode current collector layer; and a second negative electrode active material layer on a surface opposite to a surface of the first negative electrode active material layer facing the negative electrode current collector layer.

In an exemplary embodiment of the present application, the negative electrode current collector layer generally has a thickness of 1 μm to 100 μm. The negative electrode current collector layer is not particularly limited as long as the negative electrode current collector layer has high conductivity without causing a chemical change to the battery, and for example, it is possible to use copper, stainless steel, aluminum, nickel, titanium, fired carbon, a material in which the surface of copper or stainless steel is surface-treated with carbon, nickel, titanium, silver, and the like, an aluminum-cadmium alloy, and the like. In addition, the negative electrode current collector layer may also increase the bonding strength of a negative electrode active material by forming fine convex and concave irregularities on the surface thereof, and the negative electrode current collector layer may be used in various forms such as a film, a sheet, a foil, a net, a porous body, a foaming body, and a nonwoven body.

In an exemplary embodiment of the present application, the negative electrode current collector layer may have a thickness of 1 μm or more and 100 μm or less.

However, the thickness may be variously modified depending on the type and use of the negative electrode used, and is not limited thereto.

In an exemplary embodiment of the present application, the first negative electrode active material comprises one or more selected from the group consisting of SiOx (x=0) and SiOx (0<x<2), and may comprise 95 parts by weight or more of the SiOx (x=0) based on 100 parts by weight of the first negative electrode active material.

In an exemplary embodiment of the present application, the first negative electrode active material comprises one or more selected from the group consisting of SiOx (x=0) and SiOx (0<x<2), and may comprise 95 parts by weight or more, preferably 97 parts by weight or more, and more preferably 99 parts by weight or more of the SiOx (x=0) based on 100 parts by weight of the first negative electrode active material, and may comprise 100 parts by weight or less of the SiOx (x=0).

In an exemplary embodiment of the present application, particularly pure silicon (Si) particles may be used as the first negative electrode active material. The use of pure silicon (Si) as the first negative electrode active material may mean that based on the total 100 parts by weight of the first negative electrode active material as described above, pure Si particles (SiOx (x=0)), which are not bound to other particles or elements, are included in the above range.

In an exemplary embodiment of the present application, the first negative electrode active material may include SiOx (x=0).

The first negative electrode active material layer according to the present application comprises the first negative electrode active material, and specifically may comprise pure silicon particles comprising 95 parts by weight or more of SiOx (x=0). When pure silicon particles are included in a high content, the capacity characteristics are excellent, but service life deterioration characteristics due to the surface heterogeneous reaction according to the excellent capacity characteristics occur. Accordingly, the aforementioned problem was solved by comprising the second negative electrode active material layer according to the present invention in a specific weight loading amount.

Meanwhile, the first negative electrode active material of the present invention may have an average particle diameter (D50) of 3 μm to 10 μm, specifically 4 μm to 8 μm, and more specifically 5 μm to 7 μm. When the average particle diameter is included in the above range of 3 μm to 10 μm, the viscosity of a negative electrode slurry may be formed in a suitable range because the specific surface area of the particle is included in a suitable range. Accordingly, the dispersion of the particles constituting the negative electrode slurry may be facilitated. Furthermore, the size of the first negative electrode active material has a value equal to or more than the above lower limit value range, and since a composite including a conductive material and a binder in the negative electrode slurry makes a contact area between silicon particles and conductive materials excellent, the possibility that the conductive network lasts is increased, so that the capacity retention rate is increased. Meanwhile, when the average particle diameter satisfies the above range of 3 μm to 10 μm, excessively large silicon particles are eliminated to form a smooth surface of the negative electrode, and accordingly, it is possible to prevent the heterogeneous phenomenon of the current density during charging and discharging.

In an exemplary embodiment of the present application, the first negative electrode active material generally has a characteristic BET specific surface area. The BET specific surface area of the first negative electrode active material is preferably 0.01 m²/g to 150.0 m²/g, more preferably 0.1 m²/g to 100.0 m²/g, particularly preferably 0.2 m²/g to 80.0 m²/g, and most preferably 0.2 m²/g to 18.0 m²/g. The BET surface area is measured by DIN 66131 (using nitrogen).

In an exemplary embodiment of the present application, the first negative electrode active material may be present, for example, in a crystalline or amorphous form, and preferably is not porous. The silicon particles are preferably spherical or fragment-shaped particles. Alternatively, but less preferably, the silicon particles may also have a fibrous structure or be present in the form of a film or coating comprising silicon.

In an exemplary embodiment of the present application, the first negative electrode active material may have a non-circular form, and the circularity thereof is, for example, 0.9 or less, for example, 0.7 to 0.9, for example, 0.8 to 0.9, and for example, 0.85 to 0.9.

In the present application, the circularity is determined by the following Equation A-1, where A is the area and P is the boundary line.

$$4 \, \pi A/P^2 \qquad \text{[Equation A-1]}$$

In an exemplary embodiment of the present application, provided is a negative electrode for a lithium secondary battery, in which the first negative electrode active material is present in an amount of 60 parts by weight or more based on 100 parts by weight of the first negative electrode active material layer composition.

In another exemplary embodiment, the first negative electrode active material may be included in an amount of 60 parts by weight or more, preferably 65 parts by weight or more, and more preferably 70 parts by weight or more, and 95 parts by weight or less, preferably 90 parts by weight or less, and more preferably 80 parts by weight or less, based on 100 parts by weight of the first negative electrode active material layer composition.

The first negative electrode active material layer composition according to the present application may solve one or more of a surface degradation problem in charging and discharging, a problem of uniformity during pre-lithiation, and a problem of service life characteristics without making the capacity performance of the entire negative electrode deteriorate by together using a second negative electrode active material layer to be described below even though a first negative electrode active material having a remarkably high capacity is used in the above range.

In the related art, it was common to use only a graphite-containing compound as a negative electrode active material, but recently, as the demand for a high-capacity battery has increased, attempts to mix and use a silicon-containing compound have been increased in order to increase the capacity. However, in the case of the silicon-containing compound, there is a limitation that the volume rapidly expands in the process of charging/discharging to impair the conductive path formed in the negative electrode active material layer, consequently resulting in deterioration in the performance of the battery.

Therefore, in an exemplary embodiment of the present application, the first negative electrode active material layer composition may further comprise one or more selected from the group consisting of a first negative electrode conductive material; and a first negative electrode binder.

In this case, as the first negative electrode conductive material and first negative electrode binder included in the first negative electrode active material layer composition, those used in the art may be used without limitation.

In an exemplary embodiment of the present application, as the first negative electrode conductive material, a material that may be generally used in the art may be used without limitation, and specifically, it is possible to comprise one or more selected from the group consisting of a dotted conductive material; a planar conductive material; and a linear conductive material.

In an exemplary embodiment of the present application, the dotted conductive material may be used to enhance the conductivity of the negative electrode, and means a conductive material having conductivity without inducing a chemical change and having a dot shape or circular shape. Specifically, the dotted conductive material may be at least one selected from the group consisting of natural graphite, artificial graphite, carbon black, acetylene black, Ketjen black, channel black, furnace black, lamp black, thermal black, a conductive fiber, fluorocarbon, an aluminum powder, a nickel powder, zinc oxide, potassium titanate, titanium oxide and a polyphenylene derivative, and may preferably comprise carbon black in terms of implementing high conductivity and being excellent in dispersibility.

In an exemplary embodiment of the present application, the dotted conductive material may have a BET specific surface area of 40 m²/g or more and 70 m²/g or less, preferably 45 m²/g or more and 65 m²/g or less, and more preferably 50 m²/g or more and 60 m²/g or less.

In an exemplary embodiment of the present application, the dotted conductive material may have a particle diameter of 10 nm to 100 nm, preferably 20 nm to 90 nm, and more preferably 20 nm to 60 nm.

In an exemplary embodiment of the present application, the first negative electrode conductive material may comprise a planar conductive material.

The planar conductive material may increase the surface contact between silicon particles in the negative electrode to improve conductivity and simultaneously suppress the disconnection of the conductive path due to the volume expansion, and may be expressed as a plate-like conductive material or bulk conductive material.

In an exemplary embodiment of the present application, the planar conductive material may comprise at least one selected from the group consisting of plate-like graphite, graphene, graphene oxide, and graphite flake, and may be preferably plate-like graphite.

In an exemplary embodiment of the present application, the planar conductive material may have an average particle diameter (D50) of 2 μm to 7 μm, specifically 3 μm to 6 μm, and more specifically 4 μm to 5 μm. When the average particle diameter satisfies the above range of 2 μm to 7 μm, sufficient particle size facilitates dispersion without causing an excessive increase in viscosity of the negative electrode slurry. Therefore, the dispersion effect is excellent when particles are dispersed using the same equipment and time.

In an exemplary embodiment of the present application, the planar conductive material provides a negative electrode composition having a D10 of 0.5 μm or more and 1.5 μm or less, a D50 of 2.5 μm or more and 3.5 μm or less, and a D90 of 7.0 μm or more and 15.0 μm or less.

In an exemplary embodiment of the present application, as the planar conductive material, it is possible to use a high specific surface area planar conductive material having a high BET specific surface area; or a low specific surface area planar conductive material.

In an exemplary embodiment of the present application, as the planar conductive material, a high specific surface area planar conductive material; or a low specific surface area planar conductive material may be used without limitation, but in particular, the planar conductive material according to the present application may be affected by a dispersion to some extent in the electrode performance, so that it may be particularly desirable to use a low specific surface area planar conductive material that does not cause a problem in dispersion.

In an exemplary embodiment of the present application, the planar conductive material may have a BET specific surface area of 5 m$^2$/g or more.

In another exemplary embodiment, the planar conductive material may have a BET specific surface area of 5 m$^2$/g or more and 500 m$^2$/g or less, preferably 5 m$^2$/g or more and 300 m$^2$/g or less, and more preferably 5 m$^2$/g or more and 250 m$^2$/g or less.

In still another exemplary embodiment, the planar conductive material is a high specific surface area planar conductive material, and the BET specific surface area may satisfy a range of 50 m$^2$/g or more and 500 m$^2$/g or less, preferably 80 m$^2$/g or more and 300 m$^2$/g or less, and more preferably 100 m$^2$/g or more and 300 m$^2$/g or less.

In yet another exemplary embodiment, the planar conductive material is a low specific surface area planar conductive material, and the BET specific surface may satisfy a range of 5 m$^2$/g or more and 40 m$^2$/g or less, preferably 5 m$^2$/g or more and 30 m$^2$/g or less, and more preferably 5 m$^2$/g or more and 25 m$^2$/g or less.

As other conductive materials, there may be a linear conductive material such as carbon nanotubes. The carbon nanotubes may be bundle type carbon nanotubes. The bundle type carbon nanotubes may comprise a plurality of carbon nanotube units. Specifically, the term 'bundle type' used herein, unless otherwise specified, refers to a secondary shape in the form of a bundle or rope in which the plurality of carbon nanotube units is aligned side by side or intertwined in substantially the same orientation as a longitudinal axis of the carbon nanotube unit. In the carbon nanotube unit, a graphite sheet has a cylindrical shape with a nano-sized diameter and has a sp2 bond structure. In this case, the carbon nanotube unit may exhibit characteristics of a conductor or semiconductor depending on a structure and an angle at which the graphite sheet is rolled. The bundle type carbon nanotubes may be uniformly dispersed during the preparation of a negative electrode compared to entangled type carbon nanotubes, and the conductivity of the negative electrode may be improved by smoothly forming a conductive network in the negative electrode.

In an exemplary embodiment of the present application, the first negative electrode conductive material may satisfy 10 parts by weight or more and 40 parts by weight or less based on 100 parts by weight of the first negative electrode active material layer composition.

In another exemplary embodiment, the first negative electrode conductive material may be included in an amount of 10 parts by weight or more and 40 parts by weight or less, preferably 10 parts by weight or more and 30 parts by weight or less, and more preferably 15 parts by weight or more and 25 parts by weight or less, based on 100 parts by weight of the first negative electrode active material layer composition.

In an exemplary embodiment of the present application, the first negative electrode conductive material comprises: a dotted conductive material; a planar conductive material; and a linear conductive material, and the dotted conductive material: planar conductive material:linear conductive material may satisfy a ratio of 1:1:0.01 to 1:1:1.

In an exemplary embodiment of the present application, the dotted conductive material may satisfy a range of 1 part by weight or more and 60 parts by weight or less, preferably 5 parts by weight or more and 50 parts by weight or less, and more preferably 10 parts by weight or more and 50 parts by weight or less, based on 100 parts by weight of the first negative electrode conductive material.

In an exemplary embodiment of the present application, the planar conductive material may satisfy a range of 1 part by weight or more and 60 parts by weight or less, preferably 5 parts by weight or more and 50 parts by weight or less, and more preferably 10 parts by weight or more and 50 parts by weight or less, based on 100 parts by weight of the first negative electrode conductive material.

In an exemplary embodiment of the present application, the linear conductive material may satisfy a range of 0.01 part by weight or more and 10 parts by weight or less, preferably 0.05 part by weight or more and 8 parts by weight or less, and more preferably 0.1 part by weight or more and 5 parts by weight or less, based on 100 parts by weight of the first negative electrode conductive material.

In an exemplary embodiment of the present application, the first negative electrode conductive material may comprise: a linear conductive material; and a planar conductive material.

In an exemplary embodiment of the present application, the first negative electrode conductive material comprises a linear conductive material and a planar conductive material, and the weight ratio of linear conductive material:planar conductive material may satisfy 0.01:1 to 0.1:1.

In an exemplary embodiment of the present application, provided is a negative electrode composition in which the first negative electrode conductive material comprises a dotted conductive material and a planar conductive material, and 45 to 60 parts by weight of the dotted conductive material; and 40 to 55 parts by weight of the planar conductive material based on 100 parts by weight of the first negative electrode conductive material.

In another exemplary embodiment, the first negative electrode conductive material comprises a dotted conductive material and a planar conductive material, and may comprise 45 to 60 parts by weight, preferably 47 to 58 parts by weight, and more preferably 50 to 55 parts by weight of the dotted conductive material based on 100 parts by weight of the first negative electrode conductive material.

In still another exemplary embodiment, the first negative electrode conductive material comprises a dotted conductive material and a planar conductive material, and may comprise 40 to 55 parts by weight, preferably 42 to 53 parts by weight, and more preferably 45 to 50 parts by weight of the planar conductive material based on 100 parts by weight of the first negative electrode conductive material.

In an exemplary embodiment of the present application, the weight ratio of the dotted conductive material:the planar conductive material may satisfy 1:1.

In an exemplary embodiment of the present application, as the first negative electrode conductive material satisfies the composition and ratio, the first negative electrode conductive material has a feature in which output characteristics at high C-rate are excellent because the service life characteristics of the existing lithium secondary battery are not greatly affected and points where the battery can be charged and discharged are increased.

The first negative electrode conductive material according to the present application has a completely different configuration from a conductive material applied to the positive electrode. That is, the first negative electrode conductive material according to the present application serves to capture a contact point between silicon-containing active materials in which the volume expansion of the electrode is very large due to charging and discharging, and the positive electrode conductive material serves to impart partial conductivity while playing a buffer role as a cushioning role when rolled, and the configuration and role thereof are completely different from those of the negative electrode conductive material of the present invention.

Further, the first negative electrode conductive material according to the present application may be applied to a silicon-containing active material, and has a completely different configuration from a conductive material applied to a graphite-containing active material. That is, the conductive material used for the electrode having the graphite-containing active material simply has small particles with respect to the active material, and thus has the characteristics of enhancing the output characteristics and imparting partial conductivity, and the configuration and role thereof are completely different from those of the first negative electrode conductive material applied together with the silicon-containing active material as in the present invention.

In an exemplary embodiment of the present application, the first negative electrode binder may comprise at least one selected from the group consisting of a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, polyacrylic acid, an ethylene-propylene-diene monomer (EPDM), a sulfonated EPDM, styrene butadiene rubber (SBR), fluorine rubber, polyacrylic acid and a material in which the hydrogen thereof is substituted with Li, Na, Ca, or the like, and may also comprise various copolymers thereof.

The first negative electrode binder according to an exemplary embodiment of the present application may play a role of supporting the first negative electrode active material and the first negative electrode conductive material in order to prevent the distortion and structural deformation of the negative electrode structure in the volume expansion and relaxation of the first negative electrode active material, and when the above role is satisfied, all general binders can be applied, specifically, a water-based binder can be used, and more specifically, a PAM-based binder can be used.

In an exemplary embodiment of the present application, the first negative electrode binder may be included in an amount of 30 parts by weight or less, preferably 25 parts by weight or less, and more preferably 20 parts by weight or less, and may be included in an amount of 5 parts by weight or more and 10 parts by weight or more, based on 100 parts by weight of the first negative electrode active material layer composition.

When a silicon-containing material is used in the negative electrode compared to the existing carbon-containing negative electrode, a water-based binder may be applied by the aforementioned parts by weight, so that a dotted conductive material can be used, and depending on the feature, the dotted conductive material has hydrophobicity to have a feature in which the bonding strength with the conductive material/binder becomes excellent.

In an exemplary embodiment of the present application, the second negative electrode active material may comprise one or more selected from the group consisting of a carbon-containing active material, a silicon-containing active material, a metal-containing active material capable of forming an alloy with lithium and a lithium-containing nitride.

In another exemplary embodiment, the second negative electrode active material may comprise one or more and three or less selected from the group consisting of a carbon-containing active material, a silicon-containing active material, a metal-containing active material capable of forming an alloy with lithium and a lithium-containing nitride.

In still another exemplary embodiment, the second negative electrode active material may comprise a carbon-containing active material and a silicon-containing active material.

In yet another exemplary embodiment, the second negative electrode active material may comprise a silicon-containing active material.

In an exemplary embodiment of the present application, provided is a negative electrode for a lithium secondary battery, in which the second negative electrode active material comprises a mixture of one or more selected from the group consisting of a carbon-containing active material, a silicon-containing active material, a metal-containing active material capable of forming an alloy with lithium and a lithium-containing nitride, and the silicon-containing active material is present in an amount of 1 part by weight or more and 100 parts by weight or less based on 100 parts by weight of the second negative electrode active material.

In another exemplary embodiment, the second negative electrode active material comprises a mixture of one or more selected from the group consisting of a carbon-containing active material, a silicon-containing active material, a metal-containing active material capable of forming an alloy with lithium and a lithium-containing nitride, and the silicon-containing active material may be included in an amount of 1 part by weight or more and 100 parts by weight or less, preferably 10 parts by weight or more and 100 parts by weight or less, and more preferably 15 parts by weight or more and 100 parts by weight or less, based on 100 parts by weight of the second negative electrode active material.

In an exemplary embodiment of the present application, provided is a negative electrode for a lithium secondary battery, in which the second negative electrode active material comprises a silicon-containing active material and a carbon-containing active material, and comprises 1 part by weight or more and 95 parts by weight or less of the silicon-containing active material based on 100 parts by weight of second negative electrode active material.

In an exemplary embodiment of the present application, the silicon-containing active material included in the second negative electrode active material may comprise one or more selected from the group consisting of $SiO_x$ ($0<x<2$), SiC, and a Si alloy.

In an exemplary embodiment of the present application, the silicon-containing active material included in the second negative electrode active material comprises one or more selected from the group consisting of $SiO_x$ ($0<x<2$), SiC, and a Si alloy, and may comprise 1 part by weight or more of $SiO_x$ ($0<x<2$) based on 100 parts by weight of the second negative electrode active material.

In another exemplary embodiment, the silicon-containing active material included in the second negative electrode active material comprises one or more selected from the group consisting of $SiO_x$ (0<x<2), SiC, and a Si alloy, and may comprise 1 part by weight or more, 10 parts by weight or more, and 99 parts by weight or less of $SiO_x$ (0<x<2) based on 100 parts by weight of the second negative electrode active material.

In still another exemplary embodiment, the silicon-containing active material included in the second negative electrode active material may comprise $SiO_x$ (0<x<2).

In yet another exemplary embodiment, the silicon-containing active material included in the second negative electrode active material may comprise SiC.

The negative electrode for a lithium secondary battery according to the present application comprises the aforementioned second negative electrode active material in the second negative electrode active material layer as described above. Accordingly, while maintaining the characteristics of high capacity and high density by comprising the above-described first negative electrode active material, the second negative electrode active material serves as a buffer layer, and thus has a feature capable of solving a surface degradation problem during charging and discharging, a problem of uniformity during pre-lithiation and a problem of service life characteristics.

By way of illustration, the second negative electrode active material layer of the present invention can serve as a buffer layer. Si electrodes have superior capacity characteristics when compared to SiO electrodes and carbon-containing electrodes. However, in Si electrodes, degradation at the surface is concentrated due to the rapid reaction with Li ions during charging/discharging. This also occurs in the pre-lithiation process when Li ions are applied to the negative electrode in advance. A buffer layer is applied in the pre-lithiation process to prevent direct contact between the Si electrode and lithium and to prevent surface degradation. Therefore, it is described as an effect that the second negative electrode active material layer of the present invention can play the same role as the buffer layer during the pre-lithiation process.

In an exemplary embodiment of the present application, representative examples of the carbon-containing active material comprise natural graphite, artificial graphite, expandable graphite, carbon fiber, non-graphitizable carbon, carbon black, carbon nanotubes, fullerene, activated carbon, or the like, and the carbon-containing active material can be used without limitation as long as the carbon-containing active material is typically used in a carbon material for a lithium secondary battery, and specifically may be processed into a form of a spherical or dot shape and used.

In an exemplary embodiment of the present application, the planar conductive material used as the above-described negative electrode conductive material has a structure and a role different from those of a carbon-containing active material generally used as a negative electrode active material. Specifically, the carbon-containing active material used as the negative electrode active material may be artificial graphite or natural graphite, and means a material that is processed into a spherical or dot shape and used in order to facilitate the storage and release of lithium ions.

In contrast, the planar conductive material used as the negative electrode conductive material is a material having a planar or plate-like shape, and may be expressed as plate-like graphite. That is, the planar conductive material is a material included to maintain the conductive path in the negative electrode active material layer, and means a material for securing a conductive path in the form of a surface in the negative electrode active material layer rather than a role of storing and releasing lithium.

That is, in the present application, the fact that plate-like graphite is used as a conductive material means that the plate-like graphite is processed into a planar or plate-like shape and used as a material that secures a conductive path rather than a role of storing or releasing lithium. In this case, the negative electrode active material included together has high capacity characteristics for lithium storage and release, and plays a role capable of storing and releasing all lithium ions transmitted from the positive electrode.

In contrast, in the present application, the fact that a carbon-containing active material is used as an active material means that the carbon-containing active material is processed into a dot or spherical shape and used as a material that serves to store or release lithium.

That is, in an exemplary embodiment of the present application, the BET specific surface area of artificial graphite or natural graphite, which is a carbon-containing active material may satisfy a range of 0.1 $m^2$/g or more and 4.5 $m^2$/g or less. In addition, plate-like graphite, which is a planar conductive material, is in a planar form, and may have a BET specific surface area of 5 $m^2$/g or more.

A representative example of the metal-containing active material may be a compound containing any one or two or more metal elements selected from the group consisting of Al, Sn, Ag, Bi, Mg, Zn, In, Ge, Pb, Pd, Pt, Ti, Sb, Ga, Mn, Fe, Co, Ni, Cu, Sr, and Ba and the like. These metal compounds may be used in any form such as a single body, an alloy, an oxide ($TiO_2$, $SnO_2$ and the like), a nitride, a sulfide, a boride, and an alloy with lithium, but the single body, the alloy, the oxide, and the alloy with lithium may be increased in capacity.

In an exemplary embodiment of the present application, provided is a negative electrode for a lithium secondary battery, in which the second negative electrode active material is present in an amount of 60 parts by weight or more based on 100 parts by weight of the second negative electrode active material layer composition.

In another exemplary embodiment, the second negative electrode active material may be present in an amount of 60 parts by weight or more based on 100 parts by weight of the second negative electrode active material layer composition, and may satisfy 100 parts by weight or less, and 99 parts by weight or less.

The second negative electrode active material layer composition according to the present application may have a feature of enhancing service life characteristics without making the capacity performance of the negative electrode deteriorate by using a second negative electrode active material which has lower capacity characteristics, but has less particle cracking according to the charging and discharging than the first negative electrode active material in the above range, and by suppressing the surface reaction of the negative electrode.

In an exemplary embodiment of the present application, provided is a negative electrode for a lithium secondary battery in which the second negative electrode active material layer composition further comprises one or more selected from the group consisting of a second negative electrode conductive material; and a second negative electrode binder.

In this case, the same contents as those of the above-described first negative electrode conductive material and first negative electrode binder may be applied to the contents of the second negative electrode conductive material and the second negative electrode binder.

In an exemplary embodiment of the present application, provided is a negative electrode for a lithium secondary battery, in which a weight loading amount (A) of the first negative electrode active material layer composition and a weight loading amount (B) of the second negative electrode active material layer composition satisfy the following Equation 1:

$$10 \leq (B/(A+B)) \times 100 \leq 50. \hspace{2cm} \text{[Equation 1]}$$

In an exemplary embodiment of the present application, the weight loading amount may comprise a weight ratio when a first negative electrode active material layer composition and a second negative electrode active material layer composition are included in a first negative electrode active material layer and a second negative electrode active material layer.

That is, a negative electrode including a first negative electrode active material layer and a second negative electrode active material layer is that such that by adjusting the thickness of each layer and the weight loading amount, capacity characteristics, which are an advantage when a silicon-containing negative electrode is used, are improved, and simultaneously, service life characteristics are also maximized.

In an exemplary embodiment of the present application, the weight loading amount (A) of the first negative electrode active material layer composition may satisfy a range of 40 mg/25 cm² or more and 140 mg/25 cm² or less, preferably 50 mg/25 cm² or more and 120 mg/25 cm² or less, and more preferably 55 mg/25 cm² or more and 100 mg/25 cm² or less.

In an exemplary embodiment of the present application, the weight loading amount (B) of the second negative electrode active material layer composition may satisfy a range of 10 mg/25 cm² or more and 60 mg/25 cm² or less, preferably 13 mg/25 cm² or more and 60 mg/25 cm² or less, and more preferably 13 g/25 cm² or more and 58 mg/25 cm² or less.

In an exemplary embodiment of the present application, Equation 1 may satisfy a range of 10≤(B/(A+B))×100≤50, specifically a range of 15≤(B/(A+B))×100≤50, and more specifically a range of 15≤(B/(A+B))×100≤40. Further, the upper limit and lower limit values can be applied in any combination of 10, 15, 20, 25, 30, 35, 40, 45 and 50. Exemplary, but non-limiting ranges include 15≤(B/(A+B))× 100≤45, 15≤(B/(A+B))×100≤35, 20≤(B/(A+B))×100≤40, 20≤(B/(A+B))×100≤35, 25≤(B/(A+B))×100≤45, 25≤(B/ (A+B))×100≤40, 30≤(B/(A+B))×100≤45, 30≤(B/(A+B))× 100≤40, and 35≤(B/(A+B))×100≤40.

That is, the capacity may be maximized when a pure silicon-containing active material is used as a single layer in the negative electrode, but there occurs a disadvantage in that the surface deterioration occurs according to the charging and discharging, and service life characteristics rather deteriorate when a pre-lithiation process is additionally performed. Accordingly, the present application constituted a negative electrode active material layer as two layers, and the loading amount of the first negative electrode active material layer composition as described above was satisfied in order to maximize capacity characteristics among them, and the loading amount of the second negative electrode active material layer composition that serves as a buffer layer was optimally adjusted according to the loading amount. By satisfying the range as described above, the present application has a feature which is capable of improving capacity characteristics which the silicon-containing negative electrode may have, and accordingly, is also capable of enhancing service life characteristics by comprising the second negative electrode active material layer composition in an optimum loading amount.

In an exemplary embodiment of the present application, provided is a negative electrode for a lithium secondary battery, in which the thickness of the secondary negative electrode active material layer is 25% or more and 45% or less of the total thickness of the first negative electrode active material layer and the second negative electrode active material layer.

In another exemplary embodiment, the first negative electrode active material layer may have a thickness of 10 μm or more and 200 μm or less, specifically 15 μm or more and 190 μm or less, and more specifically 20 μm or more and 170 μm or less.

In still another exemplary embodiment, the second negative electrode active material layer may have a thickness of 5 μm or more and 150 μm or less, specifically 6 μm or more and 145 μm or less, and more specifically 7 μm or more and 140 μm or less.

In an exemplary embodiment of the present application, the negative electrode for a lithium secondary battery may be pre-lithiated.

The negative electrode for a lithium secondary battery according to the present application may be a double layer, and particularly, a second negative electrode active material layer having a specific loading amount serves as a buffer layer during pre-lithiation, and thus also has a role of helping a uniform lithiation to occur in the electrode depth direction during the cycle charging and discharging.

In an exemplary embodiment of the present application, provided is a method for preparing a negative electrode for a lithium secondary battery, the method comprising: providing a negative electrode current collector layer; forming a first negative electrode active material layer by applying a first negative electrode active material layer composition to one surface or both surfaces of the negative electrode current collector layer; and forming a second negative electrode active material layer by applying a second negative electrode active material layer composition to a surface opposite to a surface of the first negative electrode active material layer facing the negative electrode current collector layer, in which the first negative electrode active material comprises one or more selected from the group consisting of SiOx (x=0) and SiOx (0<x<2), and comprises 95 parts by weight or more of the SiOx (x=0) based on 100 parts by weight of the first negative electrode active material, the second negative electrode active material comprises a mixture of two or more selected from the group consisting of a carbon-containing active material, a silicon-containing active material, a metal-containing active material capable of forming an alloy with lithium and a lithium-containing nitride, and a weight loading amount (A) of the first negative electrode active material layer composition and a weight loading amount (B) of the second negative electrode active material layer composition satisfy Equation 1.

In the method for preparing the negative electrode, the above-described contents may be applied to the composition and content included in each step.

In an exemplary embodiment of the present application, provided is forming a first negative electrode active material layer by applying a first negative electrode active material layer composition to one surface or both surfaces of the negative electrode current collector layer.

That is, the step is forming an active material layer on a negative electrode current collector layer, and may mean forming an active material layer on a surface (lower portion) brought into contact with a negative electrode current collector layer in a double layer structure.

In an exemplary embodiment of the present application, the applying of the first negative electrode active material layer composition comprises applying a first negative electrode slurry comprising the first negative electrode active material layer composition; and a negative electrode slurry solvent and drying the applied first negative electrode slurry.

In this case, the solid content of the first negative electrode slurry may satisfy a range of 10% to 40%.

In an exemplary embodiment of the present application, the forming of the first negative electrode active material layer may comprise: mixing the first negative electrode slurry; and coating one surface or both surfaces of the negative electrode current collector layer with the mixed first negative electrode slurry, and for the coating, a coating method generally used in the art may be used.

Further, a weight loading amount (A) of the above-described first negative electrode active material layer composition may be used as the same meaning of the weight loading amount (A) of the first negative electrode slurry.

In an exemplary embodiment of the present application, provided is forming a second negative electrode active material by applying a second negative electrode active material layer composition to a surface opposite to a surface of the first negative electrode active material layer brought into contact with the negative electrode current collector layer.

That is, the step is forming a second negative electrode active material layer on the first negative electrode active material layer, and may mean forming an active material layer on a surface (upper portion) apart from the negative electrode current collector layer in the double layer structure.

In an exemplary embodiment of the present application, the applying of the second negative electrode active material layer composition comprises applying a second negative electrode slurry comprising the second negative electrode active material layer composition; and a negative electrode slurry solvent and drying the applied second negative electrode slurry.

In this case, the solid content of the second negative electrode slurry may satisfy a range of 10% to 40%.

In an exemplary embodiment of the present application, provided is a method for preparing a negative electrode for a lithium secondary battery, in which the forming of the second negative electrode active material layer comprises: mixing the second negative electrode slurry; and coating a surface opposite to a surface of the first negative electrode active material layer facing the negative electrode current collector layer with the mixed second negative electrode slurry.

For the coating, a coating method generally used in the art may be used.

In addition, a weight loading amount (B) of the above-described second negative electrode active material layer composition may be used as the same meaning as the weight loading amount (B) of the second negative electrode slurry.

The description of forming the first negative electrode active material layer may be equally applied to the forming of the second negative electrode active material layer.

In an exemplary embodiment of the present application, provided is a method for preparing a negative electrode for a lithium secondary battery, in which the forming of the second negative electrode active material layer on the first negative electrode active material layer comprises a wet on dry process; or a wet on wet process.

In an exemplary embodiment of the present application, the wet on dry process may mean a process of applying a first negative electrode active material layer composition, then partially or completely drying the applied composition, and applying a second negative electrode active material layer composition to the upper portion thereof. An exemplary wet on dry process is shown in the flowchart of FIG. 5. In the wet on dry process, the first negative electrode slurry mixture is prepared, and then applied onto the current collector. The first negative electrode slurry mixture is dried to form the first layer. Then, the second negative electrode slurry mixture is prepared, and then applied on the first layer. The second negative electrode slurry mixture is dried to form the second layer. The layers may be rolled and pressed to form the negative electrode. Then, the negative electrode may be slitted two times using a single coating die. In another exemplary embodiment of the present application and the wet on wet process means a process of applying a first negative electrode active material layer composition, and then applying a second negative electrode active material layer composition to the upper portion thereof without drying the applied first negative electrode active material layer composition. An exemplary wet on wet process is shown in the flowchart of FIG. 6. In the wet on wet process, the first negative electrode slurry mixture is prepared, and then applied onto the collector as the first layer. Then, the second negative electrode slurry mixture is prepared, and then applied on the first layer. The second negative electrode slurry mixture is dried to form the second layer. The layers may be rolled and pressed to form the negative electrode. Then, the negative electrode may be slitted two times using a single coating die.

In particular, the wet on dry process applies a first negative electrode active material layer composition, then partially or completely dries the applied composition, and then applies a second negative electrode active material layer composition to the upper portion thereof, and by the process as described above, the first negative electrode active material layer and the second negative electrode active material layer may have a clear or discrete boundary. Accordingly, it may be characterized in that the compositions included in the first negative electrode active material layer and the second negative active material layer are not mixed and may include a double layer.

In an exemplary embodiment of the present application, the negative electrode slurry solvent can be used without limitation as long as the solvent can dissolve a first negative electrode active material layer composition and a second negative electrode active material layer composition, and specifically, water or NMP may be used.

As a result of the wet on wet process, a junction region may be formed. In order for the wet on wet process to occur, the viscosity of the first negative electrode active material layer composition may be lower than that of the second negative electrode active material layer composition such that inter-mixing occurs at the junction region and the process can proceed. In one embodiment, after the first negative electrode active material layer is dried (i.e., a wet on dry process), the interface is clearly formed by applying the second negative electrode composition. In another embodiment, intermixing occurs at the interface to form a junction region by applying the second negative electrode composition while the first negative electrode composition is not completely dried (or applying the first negative electrode composition and the second negative electrode composition at the same time).

In an exemplary embodiment of the present application, provided is a method for preparing a negative electrode for a lithium secondary battery, the method comprising: subjecting a negative electrode in which a first negative electrode active material layer and a second negative electrode active material layer are formed on the negative electrode current collector layer to pre-lithiation, in which the subjecting of the negative electrode to pre-lithiation comprises at least one of four of: a lithium electroplating process; a lithium metal transfer process; a lithium metal deposition process; or a stabilized lithium metal powder (SLMP) coating process.

The second negative electrode active material layer as described above comprises the above-described second negative electrode active material, is provided with a mixed composition of a silicon-containing active material and a carbon-containing active material, and may have an advantage of fast charging as it is, and in particular, since the second negative electrode active material has a mixed composition and thus is highly irreversible, it is possible to obtain an advantageous effect even in the pre-lithiation process in which the negative electrode is charged in advance. Compared to the case where only the first negative electrode active material layer is simply applied, the second negative electrode active material has the composition as described above, and thus a uniform pre-lithiation process can be performed on the upper portion of the negative electrode, and accordingly, the negative electrode has a feature in which the service life may be improved.

In an exemplary embodiment of the present application, the porosities of the first and second negative electrode active material layers may satisfy a range of 10% or more and 60% or less.

In another exemplary embodiment, the porosities of the first and second negative electrode active material layers may satisfy a range of 10% or more and 60% or less, preferably 20% or more and 50% or less, and more preferably 30% or more and 45% or less.

The porosity varies depending on the composition and content of the active material; conductive material; and binder included in the first and second negative electrode active material layers, and accordingly, the electric conductivity and resistance in the electrode are characterized by having appropriate ranges.

In an exemplary embodiment of the present application, provided is a lithium secondary battery comprising: a positive electrode; the negative electrode for a lithium secondary battery according to the present application; a separator provided between the positive electrode and the negative electrode; and an electrolyte.

The secondary battery according to an exemplary embodiment of the present specification may particularly comprise the above-described negative electrode for a lithium secondary battery. Specifically, the secondary battery may comprise a negative electrode, a positive electrode, a separator interposed between the positive electrode and the negative electrode, and an electrolyte, and the negative electrode is the same as the above-described negative electrode. Since the negative electrode has been described in detail, a specific description thereof will be omitted.

The positive electrode may comprise a positive electrode current collector layer and a positive electrode active material layer formed on the positive electrode current collector layer and comprising a positive electrode active material.

In the positive electrode, the positive electrode current collector layer is not particularly limited as long as the positive electrode current collector layer has conductivity without causing a chemical change to the battery, and for example, it is possible to use stainless steel, aluminum, nickel, titanium, fired carbon, or a material in which the surface of aluminum or stainless steel is surface-treated with carbon, nickel, titanium, silver, and the like. Further, the positive electrode current collector layer may typically have a thickness of 3 μm to 500 μm, and the adhesion of the positive electrode active material may also be enhanced by forming fine convex and concave irregularities on the surface of the current collector. For example, the positive electrode current collector layer may be used in various forms such as a film, a sheet, a foil, a net, a porous body, a foam, and a non-woven fabric body.

The positive electrode active material may be a typically used positive electrode active material. Specifically, the positive electrode active material comprises: a layered compound such as lithium cobalt oxide ($LiCoO_2$) and lithium nickel oxide ($LiNiO_2$) or a compound substituted with one or more transition metals; a lithium iron oxide such as $LiFe_3O_4$; a lithium manganese oxide such as chemical formula $Li_{1+c1}Mn_{2-c1}O_4$ ($0 \leq c1 \leq 0.33$), $LiMnO_3$, $LiMn_2O_3$, and $LiMnO_2$; a lithium copper oxide ($Li_2CuO_2$); a vanadium oxide such as $LiV_3O_8$, $V_2O_5$, and $Cu_2V_2O_7$; a Ni site type lithium nickel oxide expressed as chemical formula $LiNi_{1-c2}M_{c2}O_2$ (here, M is at least any one selected from the group consisting of Co, Mn, Al, Cu, Fe, Mg, B and Ga, and c2 satisfies $0.01 \leq c \leq 20.3$); a lithium manganese composite oxide expressed as chemical formula $LiMn_{2-c3}M_{c3}O_2$ (here, M is at least any one selected from the group consisting of Co, Ni, Fe, Cr, Zn and Ta, and c3 satisfies $0.01 \leq c \leq 30.1$) or $Li_2Mn_3MO_8$ (here, M is at least any one selected from the group consisting of Fe, Co, Ni, Cu and Zn); $LiMn_2O_4$ in which Li of the chemical formula is partially substituted with an alkaline earth metal ion, and the like, but is not limited thereto. The positive electrode may be Li-metal.

The positive electrode active material layer may comprise a positive electrode conductive material and a positive electrode binder together with the above-described positive electrode active material.

In this case, the positive electrode conductive material is used to impart conductivity to the electrode, and can be used without particular limitation as long as the positive electrode conductive material has electron conductivity without causing a chemical change in a battery to be constituted. Specific examples thereof comprise graphite such as natural graphite or artificial graphite; a carbon-containing material such as carbon black, acetylene black, Ketjen black, channel black, furnace black, lamp black, thermal black, and carbon fiber; metal powder or metal fiber such as copper, nickel, aluminum, and silver; a conductive whisker such as zinc oxide and potassium titanate; a conductive metal oxide such as titanium oxide; or a conductive polymer such as a polyphenylene derivative, and any one thereof or a mixture of two or more thereof may be used.

In addition, the positive electrode binder serves to improve the bonding between positive electrode active material particles and the adhesion between the positive electrode active material and the positive electrode current collector. Specific examples thereof may comprise polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used.

The separator separates the negative electrode and the positive electrode and provides a passage for movement of lithium ions, and can be used without particular limitation as long as the separator is typically used as a separator in a secondary battery, and in particular, a separator having an excellent ability to retain moisture of an electrolyte as well as low resistance to ion movement in the electrolyte is preferable. Specifically, it is possible to use a porous polymer film, for example, a porous polymer film formed of a polyolefin-containing polymer such as an ethylene homopolymer, a propylene homopolymer, an ethylene/butene copolymer, an ethylene/hexene copolymer, and an ethylene/methacrylate copolymer, or a laminated structure of two or more layers thereof. In addition, a typical porous non-woven fabric, for example, a non-woven fabric made of a glass fiber having a high melting point, a polyethylene terephthalate fiber, and the like may also be used. Furthermore, a coated separator comprising a ceramic component or a polymeric material may be used to secure heat resistance or mechanical strength and may be selectively used as a single-layered or multi-layered structure.

Examples of the electrolyte comprise an organic liquid electrolyte, an inorganic liquid electrolyte, a solid polymer electrolyte, a gel-type polymer electrolyte, a solid inorganic electrolyte, a molten-type inorganic electrolyte, and the like, which can be used in the preparation of a lithium secondary battery, but are not limited thereto.

Specifically, the electrolyte may comprise a non-aqueous organic solvent and a lithium salt.

As the non-aqueous organic solvent, it is possible to use, for example, an aprotic organic solvent, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydrofuran, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

In particular, among the carbonate-containing organic solvents, cyclic carbonates ethylene carbonate and propylene carbonate may be preferably used because the cyclic carbonates have high permittivity as organic solvents of a high viscosity and thus dissociate a lithium salt well, and such a cyclic carbonate may be more preferably used since the cyclic carbonate may be mixed with a linear carbonate of a low viscosity and low permittivity such as dimethyl carbonate and diethyl carbonate in an appropriate ratio and used to prepare an electrolyte having a high electric conductivity.

As the metal salt, a lithium salt may be used, the lithium salt is a material which is easily dissolved in the non-aqueous electrolyte, and for example, as an anion of the lithium salt, it is possible to use one or more selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2$ $(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN$ and $(CF_3CF_2SO_2)_2N^-$.

In the electrolyte, for the purpose of improving the service life characteristics of a battery, suppressing the decrease in battery capacity, and improving the discharge capacity of the battery, one or more additives, such as, for example, a halo-alkylene carbonate-containing compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride may be further included in addition to the above electrolyte constituent components.

An exemplary embodiment of the present invention provides a battery module comprising the secondary battery as a unit cell, and a battery pack comprising the same. The battery module and the battery pack comprise the secondary battery which has high capacity, high rate properties, and cycle properties, and thus, may be used as a power source of a medium-and-large sized device selected from the group consisting of an electric car, a hybrid electric vehicle, a plug-in hybrid electric vehicle, and a power storage system.

Hereinafter, preferred embodiments will be suggested to facilitate understanding of the present invention, but the embodiments are only provided to illustrate the present invention, and it is apparent to those skilled in the art that various alterations and modifications are possible within the scope and technical spirit of the present invention, and it is natural that such alterations and modifications also fall within the accompanying claims.

PREPARATION EXAMPLES

<Preparation of Negative Electrode>

Example 1

Preparation of First Negative Electrode Active Material Layer

A first negative electrode slurry was prepared by adding Si (average particle diameter (D50): 5 μm) as a silicon-containing active material, a first conductive material, a second conductive material, and polyacrylamide as a binder at a weight ratio of 70:10:10:10 to distilled water as a solvent for forming a negative electrode slurry (solid concentration of 25 wt %).

The first conductive material was carbon black C (specific surface area: 58 m²/g, diameter: 37 nm), and the second conductive material was plate-like graphite (specific surface area: 17 m²/g, average particle diameter (D50): 3.5 μm).

After the first conductive material, the second conductive material, the binder and water were dispersed at 2500 rpm for 30 minutes using a homo mixer as a mixing method, the active material was added thereto, and then the resulting mixture was dispersed at 2500 rpm for 30 minutes to prepare a slurry.

Both surfaces of a copper current collector (thickness: 8 μm) as a negative electrode current collector were coated with the first negative electrode slurry in a weight loading amount shown in the following Table 1, and the copper current collector was roll-pressed and dried in a vacuum oven at 130° C. for 10 hours to form a first negative electrode active material layer (thickness shown in Table 1 below).

Preparation of Second Negative Electrode Active Material Layer and Pre-Lithiation A second negative electrode slurry was prepared by adding SiO (average particle diameter (D50): 3.5 μm) as a silicon-containing active material, artificial graphite as a carbon-containing active material, a first conductive material, a second conductive material, and polyacrylamide as a binder at a weight ratio of 30:50:5:5:10 to distilled water as a solvent for forming a negative electrode slurry (solid concentration of 25 wt %).

The first conductive material was carbon black C (specific surface area: 58 m²/g, diameter: 37 nm), and the second conductive material was plate-like graphite (specific surface area: 17 m²/g, average particle diameter (D50): 3.5 μm).

After the first conductive material, the second conductive material, the binder and water were dispersed at 2500 rpm for 30 minutes using a homo mixer as a mixing method, the active material was added thereto, and then the resulting mixture was dispersed at 2500 rpm for 30 minutes to prepare a slurry.

The first negative electrode active material layer was coated with the second negative electrode slurry in a weight loading amount shown in Table 1, roll-pressed and dried in a vacuum oven at 130° C. for 10 hours to form a second negative electrode active material layer.

Thereafter, pre-lithiation was performed by transferring lithium metal to the upper portion of the second negative electrode active material layer. For a pre-lithiation ratio, pre-lithiation was performed as shown in the following Table 1 based on the negative electrode charging capacity. For reference, a pre-lithiation ratio of 0% means that pre-lithiation is not performed.

Examples 2 to 6 and Comparative Examples 1 to 4:
Preparation of Negative Electrode Further, a negative electrode was prepared in the same manner in Example 1, except that in Examples 2 to 6 and Comparative Examples 1 to 4, weight loading amounts and capacity loading weights were changed as in the following Table 1.

Example 7: Preparation of Negative Electrode
Preparation of First Negative Electrode Active Material Layer A first negative electrode active material layer composition comprising Si (average particle diameter (D50): 5 μm) as a silicon-containing active material, a first conductive material, a second conductive material, a third conductive material and polyacrylamide as a binder at a weight ratio of 70:9.8:10:0.2:10 was prepared. A first negative electrode slurry was prepared by adding the first negative electrode active material layer composition to distilled water as a solvent for forming a negative electrode slurry (solid concentration of 25 wt %).

The first conductive material was carbon black C (specific surface area: 58 m²/g, diameter: 37 nm), the second conductive material was plate-like graphite (specific surface area: 17 m²/g, average particle diameter (D50): 3.5 μm), and the third conductive material was carbon nanotubes.

After the first conductive material, the second conductive material, the third conductive material, the binder and water were dispersed at 2500 rpm for 30 minutes using a homo mixer as a mixing method, the active material was added thereto, and then the resulting mixture was dispersed at 2500 rpm for 30 minutes to prepare a slurry.

Both surfaces of a copper current collector (thickness: 8 μm) as a negative electrode current collector were coated with the first negative electrode slurry in a weight loading amount shown in the following Table 1, and the copper current collector was roll-pressed and dried in a vacuum oven at 130° C. for 10 hours to form a first negative electrode active material layer (thickness shown in Table 1 below).

Preparation of Second Negative Electrode Active Material Layer and Pre-Lithiation A second negative electrode active material layer composition comprising SiO (average particle diameter (D50): 3.5 μm) as a silicon-containing active material, a first conductive material, a second conductive material, and polyacrylamide as a binder at a weight ratio of 70:19.8:0.2:10 was prepared. A second negative electrode slurry was prepared by adding the second negative electrode active material layer composition to distilled water as a solvent for forming a negative electrode slurry (solid concentration of 25 wt %).

The first conductive material was plate-like graphite (specific surface area: 17 m²/g, average particle diameter (D50): 3.5 μm), and the second conductive material was carbon nanotubes.

After the first conductive material, the second conductive material, the binder and water were dispersed at 2500 rpm for 30 minutes using a homo mixer as a mixing method, the active material was added thereto, and then the resulting mixture was dispersed at 2500 rpm for 30 minutes to prepare a slurry.

The first negative electrode active material layer was coated with the second negative electrode slurry in a weight loading amount shown in the following Table 1, roll-pressed and dried in a vacuum oven at 130° C. for 10 hours to form a second negative electrode active material layer (thickness shown in Table 1 below).

Thereafter, pre-lithiation was performed by transferring lithium metal to the upper portion of the second negative electrode active material layer. For the pre-lithiation ratio, 10 to 15% pre-lithiation was achieved based on the negative electrode charging capacity.

Example 8: Preparation of Negative Electrode

A negative electrode was prepared under the same conditions as in Example 7 (solid concentration of 25 wt %), except that in the preparation of the second negative electrode active material layer in Example 7, a second negative electrode active material layer composition comprising SiC (average particle diameter (D50): 3.5 μm) as a silicon-containing active material, a first conductive material, a second conductive material, and polyacrylamide as a binder at a weight ratio of 70:19.8:0.2:10 was prepared, and added to distilled water as a solvent for forming a negative electrode slurry to prepare a second negative electrode slurry.

Example 9: Preparation of Negative Electrode

A negative electrode was prepared under the same conditions as in Example 1 (solid concentration of 25 wt %), except that in the preparation of the second negative electrode active material layer in Example 1, a second negative electrode active material layer composition comprising SiO (average particle diameter (D50): 3.5 μm) as a silicon-containing active material, a first conductive material, a second conductive material, and polyacrylamide as a binder at a weight ratio of 63:17:0.3:19.7 was prepared, and added to distilled water as a solvent for forming a negative electrode slurry to prepare a second negative electrode slurry. In this case, in order to adjust the capacity loading of the first negative electrode active material layer composition and the capacity loading of the second negative electrode active material layer composition to 7.5:1 as in the following Table 1, the negative electrode active material layer compositions were loaded in a weight loading amount shown in the following Table 1.

Example 10: Preparation of Negative Electrode

Preparation of First Negative Electrode Active Material Layer

A first negative electrode active material layer was prepared in the same manner as in Example 1.
Preparation of Second Negative Electrode Active Material Layer and Pre-Lithiation A second negative electrode active material layer composition comprising SiO (average particle diameter (D50): 3.5 μm) as a silicon-containing active material, artificial graphite, a first conductive material, a second conductive material, and polyacrylamide as a binder at a weight ratio of 50:20:10:10:10 was prepared. A second negative electrode slurry was prepared by adding the second negative electrode active material layer composition to distilled water as a solvent for forming a negative electrode slurry (solid concentration of 25 wt %).

The first conductive material was plate-like graphite (specific surface area: 17 m²/g, average particle diameter (D50): 3.5 μm), and the second conductive material was carbon nanotubes.

After the first conductive material, the second conductive material, the binder and water were dispersed at 2500 rpm for 30 minutes using a homo mixer as a mixing method, the active material was added thereto, and then the resulting mixture was dispersed at 2500 rpm for 30 minutes to prepare a slurry.

The first negative electrode active material layer was coated with the second negative electrode slurry in a weight loading amount shown in the following Table 1, roll-pressed and dried in a vacuum oven at 130° C. for 10 hours to form a second negative electrode active material layer (thickness shown in Table 1 below).

Thereafter, pre-lithiation was performed by transferring lithium metal to the upper portion of the second negative electrode active material layer.

In this case, in order to adjust the capacity loading of the first negative electrode active material layer composition and the capacity loading of the second negative electrode active material layer composition to 7.5:1 as in the following Table 1, the negative electrode active material layer compositions were loaded in a weight loading amount shown in the following Table 1.

Comparative Example 5: Preparation of Negative Electrode

A negative electrode was prepared in the same manner as in Example 1, except that the stacking order of the first negative electrode active material layer and the second negative electrode active material layer was changed in Example 1. That is, the second negative electrode active material layer was applied to the current collector and the first negative electrode active material layer was applied to the second negative electrode active material layer.

Comparative Example 6: Preparation of Negative Electrode

An active material layer composition was prepared by mixing Si (average particle diameter (D50): 5 μm), SiO (average particle diameter (D50): 3.5 μm), a first conductive material, a second conductive material, a third conductive material and polyacrylamide as a binder at a weight ratio of 52.5:17.5:9.8:10:0.2:10. A negative electrode slurry was prepared by adding the active material layer composition to distilled water as a solvent for forming a negative electrode slurry (solid concentration of 25 wt %).

The first conductive material was carbon black C (specific surface area: 58 m²/g, diameter: 37 nm), the second conductive material was plate-like graphite (specific surface area: 17 m²/g, average particle diameter (D50): 3.5 μm), and the third conductive material was carbon nanotubes.

After the first conductive material, the second conductive material, the third conductive material, the binder and water were dispersed at 2500 rpm for 30 minutes using a homo mixer as a mixing method, the active material was added thereto, and then the resulting mixture was dispersed at 2500 rpm for 30 minutes to prepare a slurry.

Both surfaces of a copper current collector (thickness: 8 μm) as a negative electrode current collector were coated with the negative electrode slurry in the following 85 mg/25 cm², and the copper current collector was roll-pressed and dried in a vacuum oven at 130° C. for 10 hours to form a negative electrode active material layer (thickness: 33 μm).

Thereafter, pre-lithiation was performed by transferring lithium metal to the upper portion of the negative electrode active material layer.

TABLE 1

| | | | | | | $10 \leq (B/(A + B)) \times 100\ (\%) \leq 50$ | | |
| | Weight loading amount (A) of first negative electrode active material layer composition | Loading amount (B) of second negative electrode active material layer composition | Equation 1 | Thickness of the first negative electrode active material layer (μm) | Thickness of the second negative electrode active material layer (μm) | Capacity loading of first negative electrode active material layer composition (mAh/cm²) | Capacity loading of second negative electrode active material layer composition (mAh/cm²) | Pre-lithiation ratio (%) |
|---|---|---|---|---|---|---|---|---|
| Example 1 | 69 mg/25 cm² | 23.1 mg/25 cm² | 25.08 | 24.7 | 9.5 | 7.64 | 0.86 | 13 |
| Example 2 | 73 mg/25 cm² | 13 mg/25 cm² | 15.12 | 26 | 7.5 | 8.03 | 0.47 | 13 |
| Example 3 | 64.5 mg/25 cm² | 38 mg/25 cm² | 37.07 | 23 | 13.3 | 7.1 | 1.4 | 13 |
| Example 4 | 67.5 mg/25 cm² | 29 mg/25 cm² | 30.05 | 24 | 10.7 | 7.43 | 1.07 | 13 |

TABLE 1-continued

| | | | | | | | | |
|---|---|---|---|---|---|---|---|---|
| | | | | 10 ≤ (B/(A + B)) × 100 (%) ≤ 50 | | | | |
| | Weight loading amount (A) of first negative electrode active material layer composition | Loading amount (B) of second negative electrode active material layer composition | Equation 1 | Thickness of the first negative electrode active material layer (μm) | Thickness of the second negative electrode active material layer (μm) | Capacity loading of first negative electrode active material layer composition (mAh/cm²) | Capacity loading of second negative electrode active material layer composition (mAh/cm²) | Pre-lithiation ratio (%) |
| Example 5 | 6 9 mg/2 5 cm² | 23.1 mg/25 cm² | 25.08 | 24.7 | 9.5 | 7.64 | 0.86 | 0 |
| Example 6 | 57.88 mg/25 cm² | 57.88 mg/25 cm² | 50.00 | 21.76 | 11.82 | 6.73 | 1.77 | 13 |
| Example 7 | 68.1 mg/25 cm² | 25.4 mg/25 cm² | 27.17 | 23.8 | 7.5 | 7.5 | 1 | 13 |
| Example 8 | 68.1 mg/25 cm² | 25.4 mg/25 cm² | 27.17 | 23.8 | 7.5 | 7.5 | 1 | 13 |
| Example 9 | 68.1 mg/25 cm² | 28.4 mg/25 cm² | 29.43 | 24.7 | 9 | 7.5 | 1 | 13 |
| Example 10 | 68.1 mg/25 cm² | 36.3 mg/25 cm² | 34.77 | 24.7 | 7 | 7.5 | 1 | 13 |
| Comparative Example 1 | 77.2 mg/25 cm² | — | — | 27.46 | — | 8.5 | — | 13 |
| Comparative Example 2 | 77.2 mg/25 cm² | — | — | 27.46 | — | 8.5 | — | 0 |
| Comparative Example 3 | 54.8 mg/25 cm² | 66.9 mg/25 cm² | 54.97 | 20 | 14 | 6.031 | 2.469 | 13 |
| Comparative Example 4 | 75.3 mg/25 cm² | 5.7 mg/25 cm² | 7.04 | 22.8 | 3.5 | 8.3 | 0.2 | 13 |
| Comparative Example 5 | 23.1 mg/25 cm² | 69 mg/25 cm² | 74.92 | 3.5 | 41.8 | 0.86 | 7.64 | 13 |
| Comparative Example 6 | Negative electrode slurry of Comparative Example 6 85 mg/25 cm² | | — | — | — | — | — | 13 |

<Preparation of Secondary Battery>

A positive electrode slurry was prepared by adding $LiNi_{0.6}Co_{0.2}Mn_{0.2}O_2$ (average particle diameter (D50): 15 μm) as a positive electrode active material, carbon black (product name: Super C65, manufacturer: Timcal) as a conductive material, and polyvinylidene fluoride (PVdF) as a binder at a weight ratio of 97:1.5:1.5 to N-methyl-2-pyrrolidone (NMP) as a solvent for forming a positive electrode slurry (solid concentration of 78 wt %).

Both surfaces of an aluminum current collector (thickness: 12 μm) as a positive electrode current collector were coated with the positive electrode slurry in a loading amount of 537 mg/25 cm², and the aluminum current collector was roll-pressed and dried in a vacuum oven at 130° C. for 10 hours to form a positive electrode active material layer (thickness: 65 μm), thereby preparing a positive electrode (thickness of the positive electrode: 77 μm, porosity of 26%).

A lithium secondary battery was prepared by interposing a polyethylene separator between the positive electrode and the negative electrode of each of the Examples and the Comparative Examples and injecting an electrolyte thereinto.

The electrolyte was obtained by adding 3 wt % of vinylene carbonate based on the total weight of the electrolyte to an organic solvent in which fluoroethylene carbonate (FEC) and diethyl carbonate (DEC) were mixed at a volume ratio of 30:70 and adding $LiPF_6$ as a lithium salt at a concentration of 1 M thereto.

Experimental Example 1: Evaluation of Service Life Characteristics

The service lives and capacity retention rates of the secondary batteries comprising the negative electrodes prepared in Examples 1 to 10 and Comparative Examples 1 to 6 were evaluated using an electrochemical charging and discharging device. The secondary batteries were subjected to in-situ cycle test at 4.2-3.0 V 1 C/0.5 C, and the capacity retention rates were measured by charging/discharging the secondary batteries at 0.33 C/0.33 C (4.2-3.0 V) every 50 cycles during the test. The following Tables 2-1, 2-2 and 3 show an in-situ capacity retention rate rather than an RPT capacity retention rate.

$$\text{Capacity retention rate (\%)} = \{(\text{Discharge capacity in the Nth cycle})/(\text{Discharge capacity in the 1st cycle})\} \times 100$$

FIG. 3 illustrates a graph of in-situ capacity retention rates according to the Examples and the Comparative Examples. Specifically, FIG. 3 relates to a graph of the in-situ (continuous cycle, 4.2-3.0 V, 1 C/0.5 C) capacity retention rates according to the Examples and the Comparative Examples.

Experimental Example 2: Evaluation of Resistance Increase Rate Measurement

After the capacity retention rates were measured by charging/discharging the secondary batteries at 0.33 C/0.33 C (4.2-3.0 V) every 50 cycles during the test in Experimental Example 1, the resistance increase rates were compared and analyzed by discharging the secondary batteries at 2.5 C pulse in SOC50 to measure the resistance.

FIG. 4 illustrates a graph of RPT resistance increase rates according to the Examples and the Comparative Examples. Specifically, the graph means a graph of the RPT (measured at 2.5 C pulse in the discharge direction at SOC50 after charging/discharging at 0.33 C/0.33 C, 4.2-3.0 V every 50 cycles during the in-situ continuous cycle test) resistance increase rate according to the Examples and the Comparative Examples.

Further, for the evaluation of the service life characteristics and the evaluation of the resistance increase rate measurement, data at 200 cycle was each calculated, and the results are shown in the following Tables 2-1, 2-2 and 3.

TABLE 2-1

|  | Example 1 | Example 2 | Example 3 | Example 4 | Example 5 | Example 6 |
|---|---|---|---|---|---|---|
| Evaluation of capacity retention rate (%, @200 cycle | 90.76 | 89.95 | 88.95 | 90.06 | 88.16 | 88.46 |
| Resistance increase rate (%, @200 cycle | 3.08 | 3.4 | 4.2 | 7.6 | 7.2 | 6.8 |

TABLE 2-2

|  | Comparative Example 1 | Comparative Example 2 | Comparative Example 3 | Comparative Example 4 |
|---|---|---|---|---|
| Evaluation of capacity retention rate (%, @200 cycle | 77.11 | 78.74 | 76.5 | 81.73 |
| Resistance increase rate (8, @200 cycle | 13.65 | 12.6 | 10.2 | 30 |

TABLE 3

|  | Example 7 | Example 8 | Example 9 | Example 10 | Comparative Example 5 | Comparative Example 6 |
|---|---|---|---|---|---|---|
| Evaluation of capacity retention rate (%, @200 cycle | 88.2 | 87.5 | 88 | 87.5 | 82 | 85 |
| Resistance increase rate (%, @200 cycle | 17.2 | 17.8 | 17.5 | 17.7 | 31 | 22.2 |

As can be confirmed in Tables 2-1, 2-2 and 3, it could be confirmed that the negative electrodes of Examples 1 to 10 were better in the evaluation of capacity retention rate and resistance increase rate than the negative electrodes of Comparative Examples 1 to 6. In particular, as can be confirmed in Examples 1 to 10 and Comparative Examples 1 to 6 of Table 1, it could be confirmed that the negative electrode for a lithium secondary battery enhanced optimum capacity characteristics and simultaneously service life characteristics by optimizing the weight loading ratio of a first negative electrode active material layer composition having a high capacity feature and second negative electrode active material layer composition which can control a reaction heterogeneity in which the reaction is concentrated only on the electrode surface during the charging and discharging of the first negative electrode active material layer, and which is excellent in durability, in the preparation of a negative electrode having the same capacity (8.5 mAh/cm²).

In Comparative Example 1, a single-layered active material layer comprising Si particles as the negative electrode active material was used so as to have the same negative electrode capacity as in Examples 1 to 6. In this case, it could be confirmed that the initial capacity was excellent, but the capacity retention rate dropped and the resistance increase rate was high due to the cracking of Si particles on the electrode surface. From this, it was possible to confirm the role of the second negative electrode active material layer according to the present application, which serves as a buffer layer.

Comparative Example 2 is a negative electrode, in which a single-layered active material layer comprising Si particles is used as a negative electrode active material and pre-lithiation is not performed in Comparative Example 1. In this case, it could be confirmed that the capacity retention rate and the resistance increase rate due to the cracking of Si particles on the electrode surface during charging and discharging also decreased compared to the Examples.

Comparative Example 3 corresponds to a negative electrode in which the weight loading amount of the first negative electrode active material layer composition of the present application is smaller than that of the second negative electrode active material layer composition. In this case, it could be confirmed that in order to maintain the total capacity of the negative electrode, the thickness of the second negative electrode active material layer is increased, the fast charging performance deteriorated, and the capacity retention rate and the resistance increase rate were also decreased compared to the Examples.

Comparative Example 4 is a case where the range is less than the lower limit value of Equation 1, and Comparative Example 5 is a case where the range exceeds the upper limit value of Equation 1. That is, Comparative Example 4 and Comparative Example 5 are cases where the loading amount of the negative electrode active material composition was out of the range of Equation 1 according to the present application, and in this case, it can be confirmed that the capacity retention rate was lower and the resistance increase rate was higher than in the Examples.

Additionally, Comparative Example 5 corresponds to a negative electrode in which the order of the first negative electrode active material layer and the second negative electrode active material layer of the present application is changed. In this case, it could be confirmed that the Si particle cracking phenomenon on the electrode surface still occurred, and accordingly, the capacity retention rate decreased and the resistance increase rate was also high.

Comparative Example 6 has a single-layered negative electrode active material layer, and is a negative electrode when the Si active material and the SiO active material are blended. In this case, it could be confirmed that the capacity retention rate decreased and the resistance increase rate was also high because optimum Si and SiO contents were not satisfied compared to the case where the negative electrode active material layer was provided as two layers as in the present invention.

That is, the negative electrode for a lithium secondary battery according to the present application has a main object to have capacity characteristics and simultaneously solve the electrode surface deterioration during the charging and discharging cycle, which is an existing problem by optimizing the weight loading ratio of the first negative electrode active material layer composition and the second negative electrode active material layer composition in the preparation of a negative electrode having the same capacity.

What is claimed is:

1. A negative electrode for a lithium secondary battery, comprising:

a negative electrode current collector layer;

a first negative electrode active material layer on one surface or both surfaces of the negative electrode current collector layer; and a second negative electrode active material layer on a surface opposite to a surface of the first negative electrode active material layer facing the negative electrode current collector layer, wherein the first negative electrode active material layer comprises a first negative electrode active material layer composition comprising a first negative electrode active material, and the second negative electrode active material layer comprises a second negative electrode active material layer composition comprising a second negative electrode active material, the first negative electrode active material comprises one or more selected from the group consisting of SiOx, wherein x=0, and SiOx, wherein 0<x<2, and comprises 95 parts by weight or more of the SiOx, wherein x=0 based on 100 parts by weight of the first negative electrode active material, the second negative electrode active material comprises a one or more selected from the group consisting of a carbon-containing active material, a silicon-containing active material, a metal-containing active material configured to form an alloy with lithium and a lithium-containing nitride, a weight loading amount (A) of the first negative electrode active material layer composition and a weight loading amount (B) of the second negative electrode active material layer composition satisfy the following Equation 1:

$$10 \leq (B/(A+B)) \times 100(\%) \leq 50, \text{ and} \qquad \text{[Equation 1]}$$

the weight loading amount (A) and weight loading amount (B) are in terms of mg/cm² and wherein the weight loading amount (A) is in a range of 40 mg/25 cm² or more and 140 mg/25 cm² or less and the weight loading amount (B) is in a range of 10 mg/25 cm² or more and 60 mg/25 cm² or less.

2. The negative electrode of claim 1, wherein the silicon-containing active material of the second negative electrode active material is present in an amount of 1 part by weight or more and 100 parts by weight or less based on 100 parts by weight of the second negative electrode active material.

3. The negative electrode of claim 1, wherein the silicon-containing active material of the second negative electrode active material comprises one or more selected from the group consisting of SiOx, wherein 0<x<2, SiC, and a Si alloy.

4. The negative electrode of claim 1, wherein the silicon-containing active material of the second negative electrode active material comprises SiOx, wherein 0<x<2.

5. The negative electrode of claim 1, wherein the first negative electrode active material is present in an amount of 60 parts by weight or more based on 100 parts by weight of the first negative electrode active material layer composition.

6. The negative electrode of claim 1, wherein a thickness of the second negative electrode active material layer is 25% or more and 45% or less of a total thickness of the first negative electrode active material layer and the second negative electrode active material layer.

7. The negative electrode of claim 1, wherein the first negative electrode active material layer composition further comprises one or more selected from the group consisting of a first negative electrode conductive material and a first negative electrode binder, and the second negative electrode active material layer composition further comprises one or more selected from the group consisting of a second negative electrode conductive material and a second negative electrode binder.

8. The negative electrode of claim 7, wherein the first negative electrode conductive material and the second negative electrode conductive material comprise one or more selected from the group consisting of a dotted conductive material, a linear conductive material, and a planar conductive material.

9. A method for preparing a negative electrode for a lithium secondary battery, the method comprising:

providing a negative electrode current collector layer;

forming a first negative electrode active material layer by applying a first negative electrode active material layer composition on one surface or both surfaces of the negative electrode current collector layer; and forming a second negative electrode active material layer by applying a second negative electrode active material layer composition to a surface of the first negative electrode active material layer opposite to a surface of the first negative electrode active material layer facing the negative electrode current collector layer, wherein the first negative electrode active material comprises one or more selected from the group consisting of SiOx, wherein x=0, and SiOx, wherein 0<x<2, and comprises 95 parts by weight or more of the SiOx, wherein x=0 based on 100 parts by weight of the first negative electrode active material, the second negative electrode active material comprises one or more selected from the group consisting of a carbon-containing active material, a silicon-containing active material, a metal-containing active material configured to form an alloy with lithium and a lithium-containing nitride, a weight loading amount (A) of the first negative electrode active material layer composition and a weight loading amount (B) of the second negative electrode active material layer composition satisfy the following Equation 1:

$$10 \leq (B/(A+B)) \times 100(\%) \leq 50, \text{ and} \qquad \text{[Equation 1]}$$

the weight loading amount (A) and weight loading amount (B) are in terms of mg/cm² and wherein the weight loading amount (A) is in a range of 40 mg/25 cm² or more and 140 mg/25 cm² or less and the weight loading amount (B) is in a range of 10 mg/25 cm² or more and 60 mg/25 cm² or less.

10. The method of claim 9, further comprising:

subjecting a negative electrode in which the first negative electrode active material layer and the second negative electrode active material layer are present on the negative electrode current collector to pre-lithiation, wherein the subjecting of the negative electrode to pre-lithiation comprises at least one of: a lithium electroplating process, a lithium metal transfer process, a lithium metal deposition process, or a stabilized lithium metal powder (SLMP) coating process.

11. A lithium secondary battery comprising:

a positive electrode;

the negative electrode for a lithium secondary battery of claim 1;

a separator provided between the positive electrode and the negative electrode; and an electrolyte.

12. The negative electrode of claim 1, wherein the first negative electrode active material layer is in contact with an entire surface of the negative electrode current collector layer, and wherein the second negative electrode active material layer is in contact with an entire surface of the first negative electrode active material layer.

13. The method of claim 9, wherein the first negative electrode active material layer is in contact with an entire surface of the negative electrode current collector layer, and wherein the second negative electrode active material layer is in contact with an entire surface of the first negative electrode active material layer.

14. The method of claim 9, wherein the second negative active material layer is formed on the first negative electrode active material layer by a wet on dry process, wherein the wet on dry process comprises:

applying the first negative electrode active material layer composition, drying the applied first negative electrode active material layer composition partially or completely, and applying the second negative electrode active material layer composition to the first negative electrode active material layer.

15. The method of claim 9, wherein the second negative active material layer is formed on the first negative electrode active material layer by a wet on wet process, wherein the wet on wet process comprises:

applying the first negative electrode active material layer composition, and applying the second negative electrode active material layer composition to the first negative electrode active material layer composition without drying the applied first negative electrode active material layer composition.

16. The negative electrode of claim 1, wherein the first negative electrode active material comprises 100 parts by weight of the SiOx, wherein x=0, based on 100 parts by weight of the first negative electrode active material.

\* \* \* \* \*